United States Patent [19]
Furuhata et al.

[11] Patent Number: 5,699,471
[45] Date of Patent: Dec. 16, 1997

[54] MAGNETIC RECORDING AND REPRODUCING APPARATUS OF VIDEO SIGNALS

[75] Inventors: Takashi Furuhata, Kamakura; Manabu Katsuki, Yokohama; Hiroki Mizosoe, Kawasaki, all of Japan

[73] Assignee: Hitachi, Ltd., Tokyo, Japan

[21] Appl. No.: 192,290

[22] Filed: Feb. 4, 1994

[30] Foreign Application Priority Data

| Feb. 5, 1993 | [JP] | Japan | 5-018416 |
| Mar. 3, 1993 | [JP] | Japan | 5-042416 |
| Jul. 22, 1993 | [JP] | Japan | 5-181072 |

[51] Int. Cl.⁶ .................................................. H04N 9/79
[52] U.S. Cl. ........................... 386/35; 386/40; 386/23
[58] Field of Search .......................... 358/310, 335, 358/342, 341, 343; 360/33.1, 32, 69; 386/1, 35, 23, 40; H04N 5/76, 5/92, 9/79

[56] References Cited

U.S. PATENT DOCUMENTS

| 4,437,125 | 3/1984 | Yamamoto | 358/327 |
| 4,638,380 | 1/1987 | Wilkinson et al. | 360/38.1 |
| 4,651,239 | 3/1987 | Omori et al. | 360/27 |
| 4,656,527 | 4/1987 | Uchimi | 358/310 |
| 4,873,583 | 10/1989 | Kobayashi et al. | 358/310 |
| 4,963,991 | 10/1990 | Honjo | 358/335 |
| 5,065,259 | 11/1991 | Kubota et al. | 358/310 |
| 5,307,171 | 4/1994 | Azuma et al. | 358/335 |
| 5,317,413 | 5/1994 | Yanagihara | 358/335 |
| 5,392,069 | 2/1995 | Koyama et al. | 358/335 |
| 5,428,454 | 6/1995 | Kimura et al. | 358/335 |

*Primary Examiner*—Thai Tran
*Attorney, Agent, or Firm*—Antonelli, Terry, Stout & Kraus, LLP

[57] ABSTRACT

An apparatus for recording and reproducing a video signal records all of effective line information required for transmission of respective picture images and voice information together with identification information in mutually resembling track patterns by setting the number of sampled picture elements per line (or block) and the number of lines (or the number of blocks) to be recorded in each track in accordance with a band ratio m of a first record video signal to a second record video signal. With this, it is possible to record and reproduce a plural types of video signals having mutually different bands and also different number of effective scanning lines and signal formats by one apparatus efficiently while checking enlargement of a circuit scale and with almost uniform picture quality performance in accordance with the difference of the bands.

19 Claims, 14 Drawing Sheets

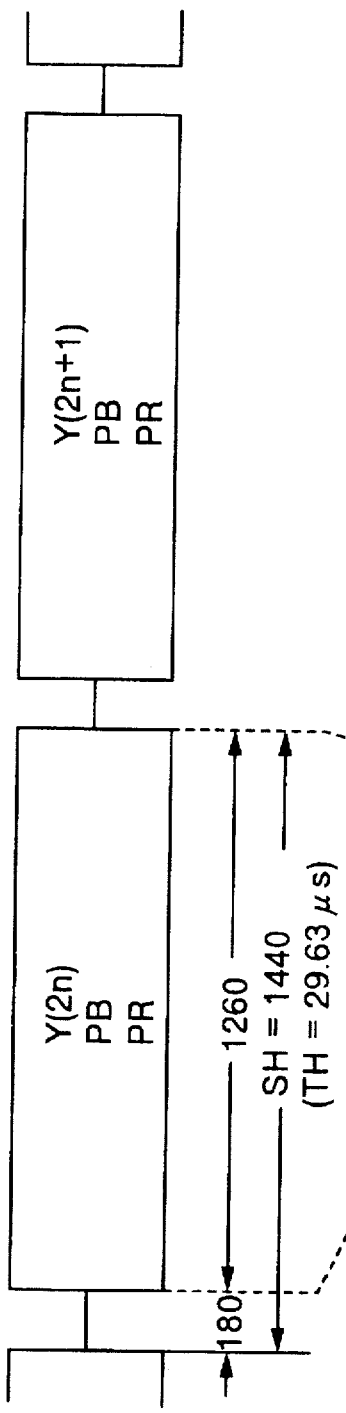
FIG.2A FIRST VIDEO SIGNAL (HD)
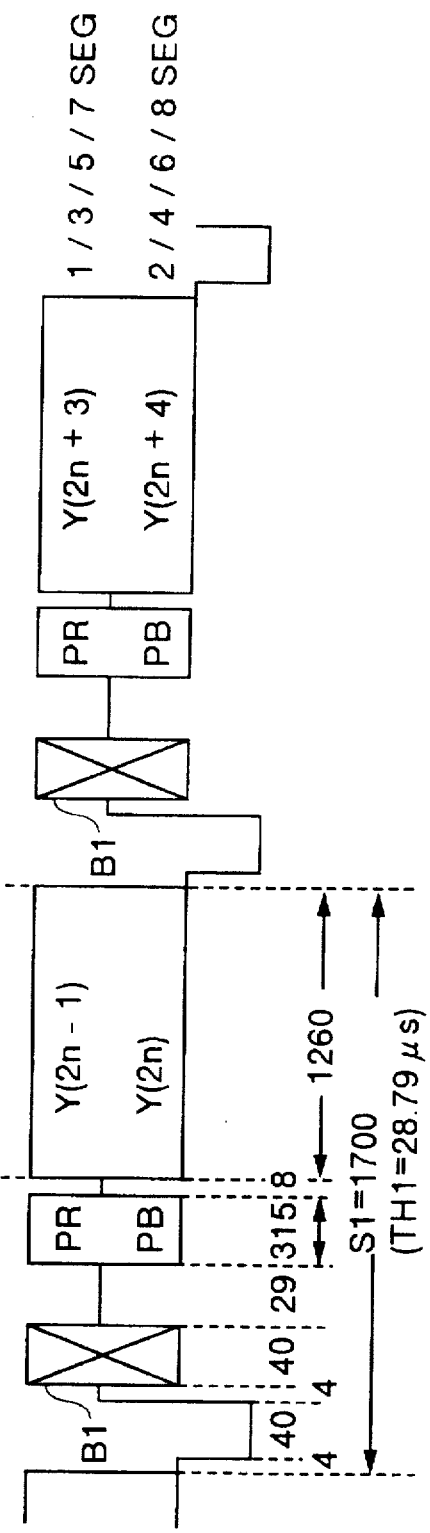
FIG.2B FIRST RECORD VIDEO SIGNAL (V1)

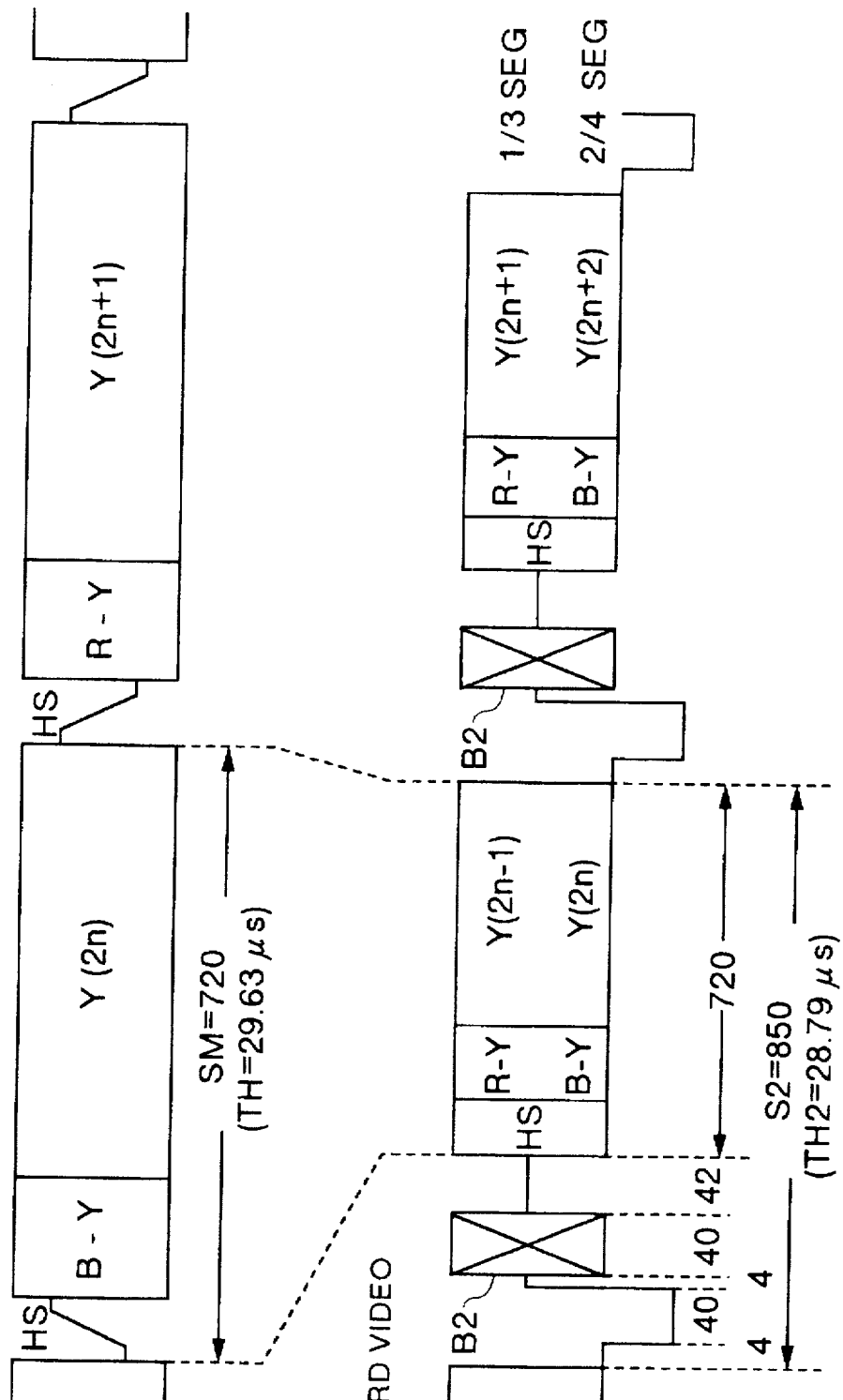

FIRST RECORDING MODE

SECOND RECORDING MODE

FIRST RECORDING MODE

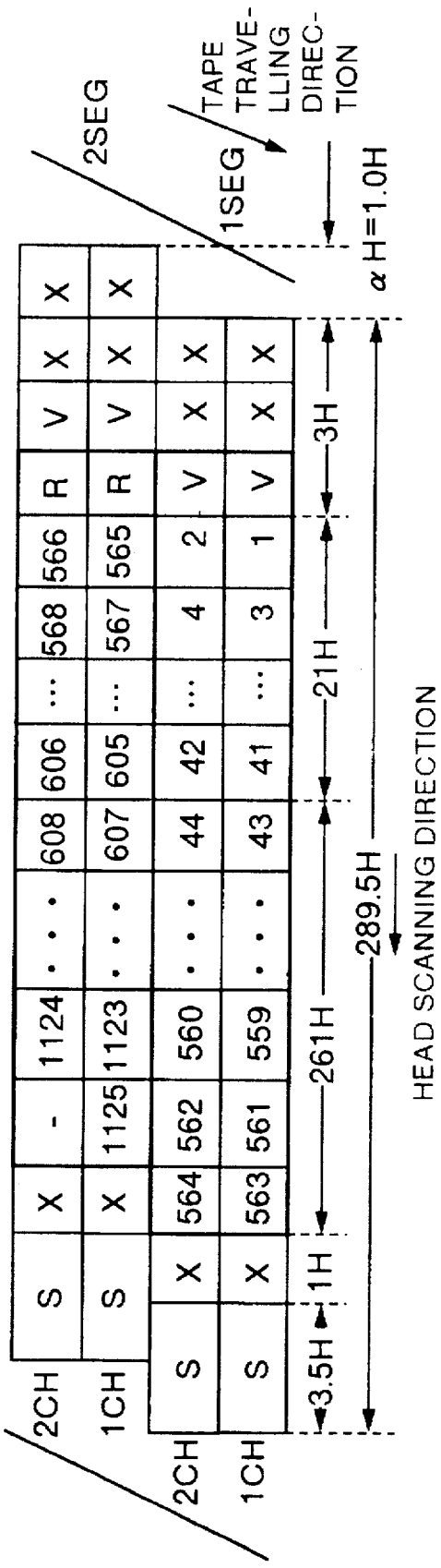
FIG.10A SECOND RECORDING MODE
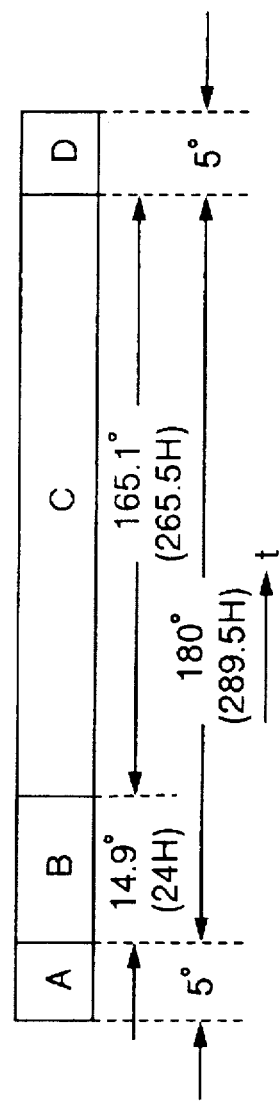
FIG.10B

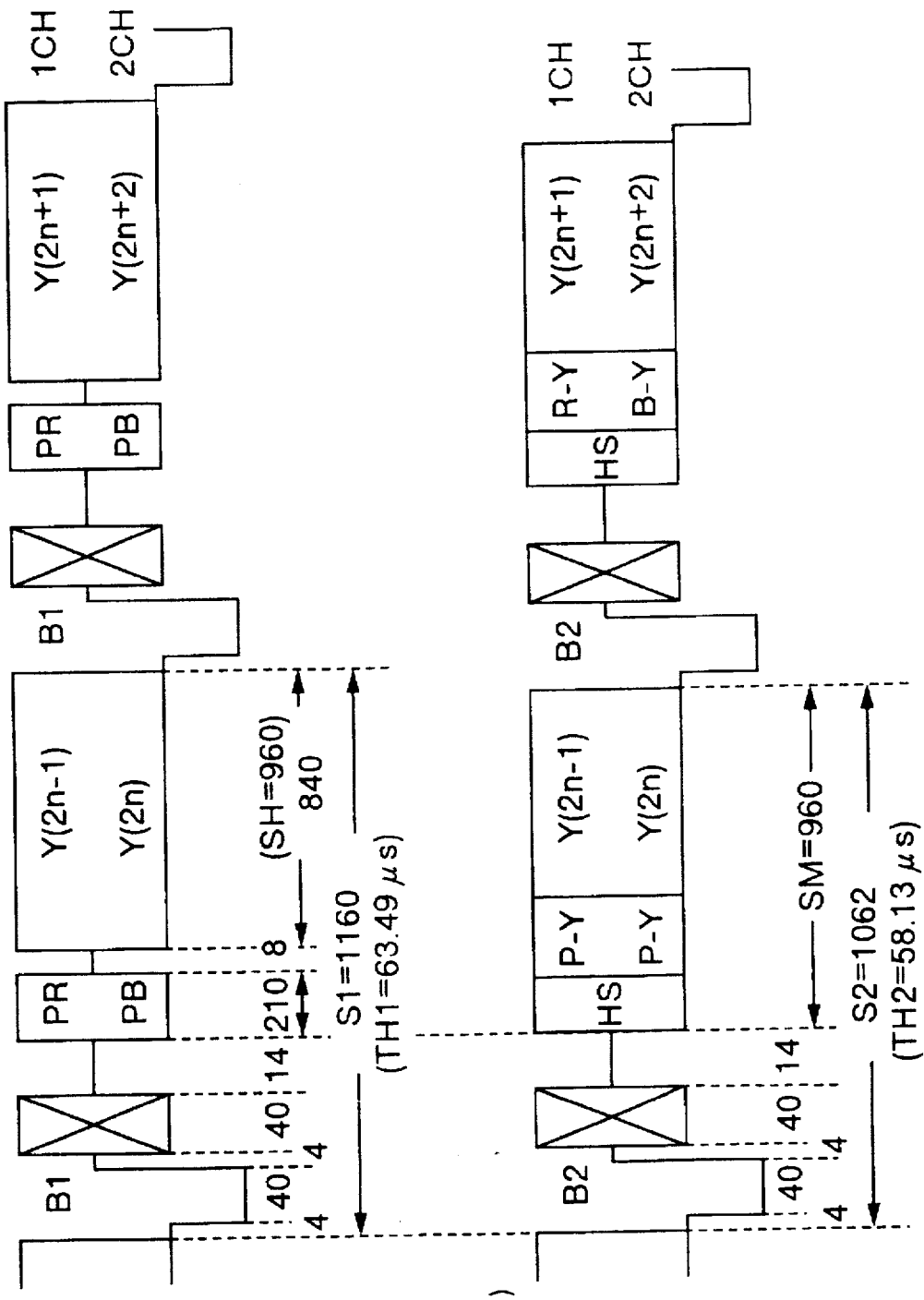
FIG.11A FIRST RECORD VIDEO SIGNAL (V1)
FIG.11B SECOND RECORD VIDEO SIGNAL (V2)

FIRST RECORDING MODE

SECOND RECORDING MODE

MAGNETIC RECORDING AND REPRODUCING APPARATUS OF VIDEO SIGNALS

BACKGROUND OF THE INVENTION

The present invention relates to an apparatus for recording and reproducing a plurality types of video signals having different signal formats, bands or the like efficiently or for recording and reproducing video signals of the same type by different systems efficiently.

In a recording and reproducing apparatus such as a video tape recorder for recording and reproducing video signals, as a method of recording and reproducing either a wide band base band video signal having a band of approximately 20 MHz such as a highly precise video signal (hereinafter referred to as a first video signal) or a video signal of a MUSE system or the like having a band narrower than the first video signal obtained by band compression to approximately a half or 10 MHz for instance (hereinafter referred to as a second video signal) is recorded and reproduced selectively as a plurality types of video signals having different signal formats and bands, a method set forth in JP-A-1-265681 in which a relative speed of a tape and a head when the first video signal and the second signal are recorded is changed, to be concrete, the relative speed in recording the second video signal is set to ½ of the relative speed in recording the first video signal, thus recording so that the recording wavelength becomes almost constant mutually is generally known.

In such a conventional method, however, sufficient consideration has not been given to a signal processing method and a recording method when the numbers of effective scanning lines and the signal formats are different between the first video signal and the second video signal. When the number of effective scanning lines and the signal formats of the first video signal and the second video signal having mutually different bands are different from each other, signal processing for recording and reproducing is required in a separate system. Thus, a circuit scale has been increased remarkably and the cost has been also increased, thus making practical use thereof difficult.

SUMMARY OF THE INVENTION

It is an object of the present invention to provide an apparatus which is enabled to record and reproduce a plurality types of video signals in different bands and also having different signal formats without increasing a circuit scale by setting recording parameters of both so that a greater part of a signal processing circuit may be used in common in view of the foregoing.

In order to achieve the above-mentioned object, according to the present invention, first, when the first video signal is recorded, processing is performed in such a manner that the first record video signal in a line unit including S1 pieces of sampled picture elements per line (or in a block unit including data of K1 pieces of sampled picture elements per block) by sampling the first video signal is generated from the first video signal, the first record video signal is divided into M (M is an integral number) pieces of channels in a field unit, and each channel is divided into N (N is an integral number) pieces of segments, so that the first video signal is recorded by being divided into M×N pieces per field (M×N×2 pieces per frame) of tracks, and L1 piece portion calculated in terms of the number of lines (or an NB1 piece portion calculated in terms of the number of blocks) of signals may be recorded in each track.

Further, when the second video signal is recorded, processing is performed in such a manner that a second record video signal in a line unit including S2 pieces of sampled picture elements per line (or in a block unit including data of K2 pieces of sampled picture elements per block) by sampling the second video signal is generated from the second video signal, so that the second record video signal may be recorded by dividing the signal into M×N/m pieces per field (M×N ×2/m pieces per frame) of tracks in accordance with a ratio m of bands (or information quantity) to be recorded between the first record video signal and the second record video signal, and L2 piece portion calculated in terms of the number of lines (or NB2 piece portion calculated in terms of the number of blocks) of signals may also be recorded.

At this time, assuming that the number of the scanning lines per frame of the first and the second video signals is L, respective parameters described above are set so as to satisfy:

$$L2=L1\times S1/S2, S1 \geq S2\times m$$

or $$NB2=NB1\times K1/K2.$$

Further, a tape speed when the first video signal is recorded is set to approximately m times as high as that of the tape speed when the second video signal is recorded in recording and reproducing.

The mutual relationship among the numbers of lines L1 and L2 (or the numbers of blocks NB1 and NB2), the numbers of sampled picture elements S2 and S2 (or K1 and K2 and the numbers of dividing into tracks per field M and N which are respective parameters for recording is realized by setting a frequency of a clock used for digital signal processing of the first video signal to m times as high as a frequency of a clock used for digital signal processing of the second video signal. With this, most parts of the digital signal processing means of the first video signal and the digital signal processing means of the second video signal can be used in common, thus producing an effect that enlargement of a circuit scale can be avoided and a plurality types of video signals having mutually different bands or signal formats can be recorded and reproduced by one apparatus efficiently and with equivalent performance. Further, it is possible to make the recording time of the second video signal m times as long as the recording time of the first video signal, and, when m>1 is set, to realize what is called long time recording function with slight increase in cost, thus producing an economical effect.

Moreover, the plurality types of video signals can be recorded by a common recording system of either analog recording or digital recording, or it is also possible to record one analogically and to record the other digitally by changing the recording system in both. In particular, according to the latter method, it is possible to record the same types of video signals in a different mode in which picture quality performance is changed in accordance with the use by one apparatus, thus further increasing a value added of the apparatus.

BRIEF DESCRIPTION OF THE DRAWINGS

FIG. 2A and FIG. 2B are diagrams showing a format of one video signal inputted and outputted in the embodiment;

FIG. 3A and FIG. 3B are diagrams showing a format of another video signal inputted and outputted in the embodiment;

FIG. 10A and FIG. 10B are diagrams showing a fourth example of a track pattern obtained in the embodiment;

FIG. 11A and FIG. 11B are diagrams showing another format of a video signal outputted in the embodiment;

DESCRIPTION OF THE PREFERRED EMBODIMENTS

The embodiments of the present invention will be described hereinafter with reference to the drawings.

Figure 1:
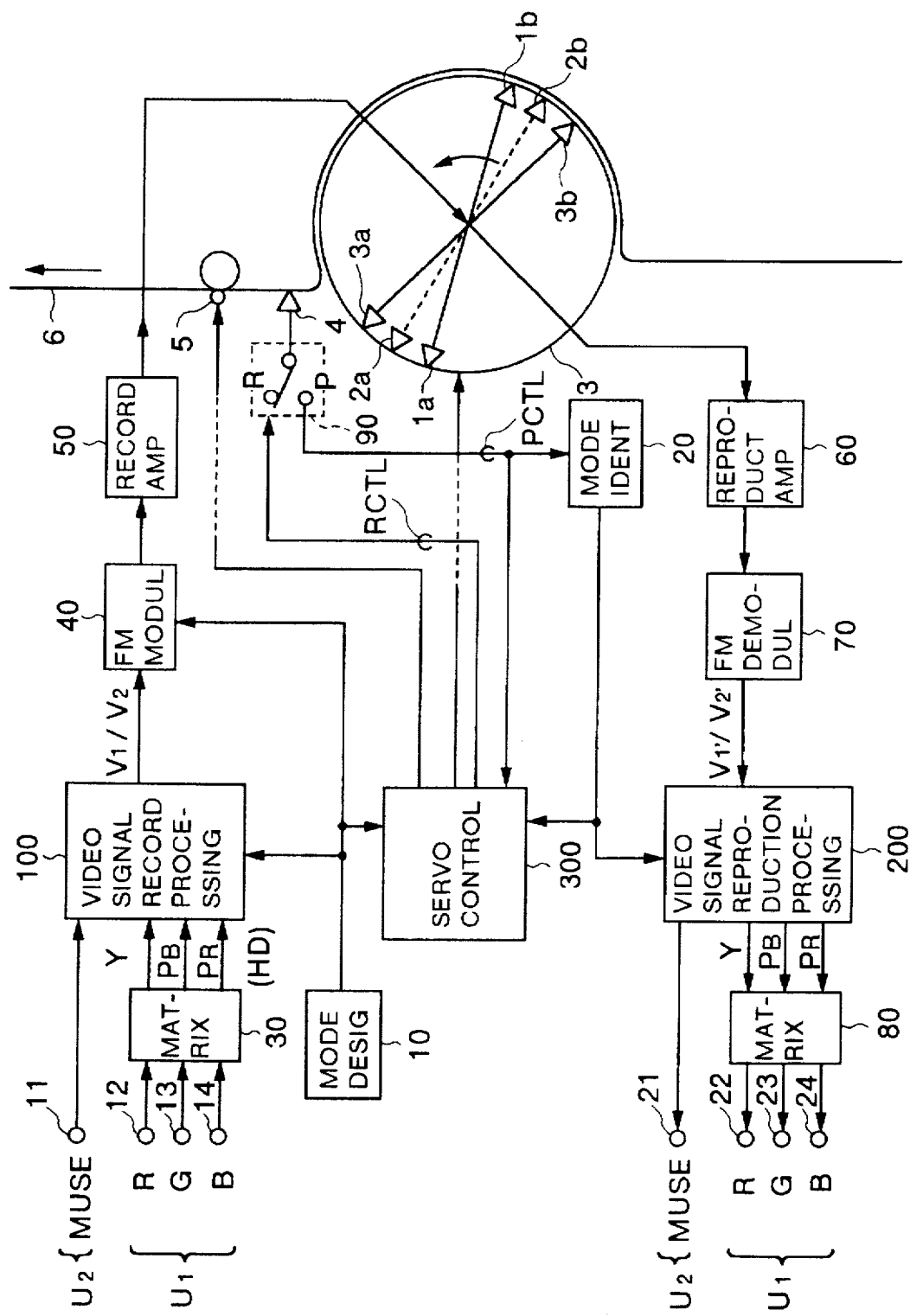
FIG. 1 is a diagram showing an embodiment of an apparatus for recording and reproducing video signals according to the present invention.

FIG. 1 is a diagram showing an apparatus for recording and reproducing video signals according to an embodiment of the present invention when a first video signal U1 and a second video signal U2 having formats and bands different from each other are recorded and reproduced selectively. FIG. 2A and FIG. 2B are diagrams showing a signal format of a first record video signal V1 (FIG. 2B) generated by converting the first video signal U1 (FIG. 2A) by record signal processing in the embodiment shown in FIG. 1. Similarly, FIG. 3A and FIG. 3B are diagrams showing a signal format of a second record video signal V2 (FIG. 3B) generated by converting the second video signal U2 (FIG. 3A) by record signal processing in the embodiment shown in FIG. 1. FIG. 4A, FIG. 4B, FIG. 5A and FIG. 5B are diagrams showing track patterns formed by recording the first record video signal V1 and the second record video signal V2 on magnetic tapes, respectively.

Here, the operation will be described using concrete numeric values in order to simplify the description. A highly precise video signal having a base band conforming to a studio standard set forth in "Technical Conditions on Television Broadcast of High Precision" of the materials of Telecommunication Technical Council is inputted to terminals 12, 13 and 14 as a concrete example of the first video signal U1. This first video signal U1 has a number of scanning lines L=1,125 lines per frame, a field frequency fv=60 Hz and a frame frequency of 30 Hz, and is inputted to the terminals 12, 13 and 14, respectively, as signals of three primary colors K, G and B having a band of 20 MHz. These three primary color signals are converted into a luminance signal Y having a band of 20 MHz and two color difference signals PB and PR having a band of 5 MHz in a matrix circuit 30 and supplied to a video signal record processing circuit 100. The video signal outputted from the matrix circuit 30 is referred to hereinafter as an HD signal. The format of the HD signal is shown typically in FIG. 2A. As shown in FIG. 2, three signals Y, PB and PR are given simultaneously in the HD signal, which is of a signal format in which these signals have horizontal blanking signals, respectively.

Next, a band compression video signal of a MUSE system (referred to hereinafter as a MUSE signal) set forth in the material of Telecommunication Technical Council is inputted to a terminal 11 as a concrete example of the second video signal U2. A format of the MUSE signal is typically shown in FIG. 3A. As shown in FIG. 3A, the MUSE signal is a signal of a format in which a positive electrode synchronizing signal HS, a luminance signal Y and color difference signals B-Y and R-Y are time division multiplexed in a line sequential system and having no horizontal blanking, and the format thereof is quite different from that of the HD signal shown in FIG. 2A. This MUSE signal is a signal having the number of scanning lines L=1,125 lines per frame, the field frequency fv=60 Hz and the frame frequency of 30 Hz similarly to the HD signal, but this signal has a different occupied bandwidth and in which the band is compressed to ½ or less of that of the HD signal or to approximately 8 MHz. Thus, description will be made here assuming a case of $$m=20/8=2$$

from the band ratio between both (the HD signal and the MUSE signal).

Further, both have different numbers of effective lines, and the video effective lines of the HD signal are #41 to #557 and #603 to #1,120 in line numbers in the frame or 1,035 lines in total. Whereas the video effective lines of the MUSE signal are 1,032 lines in total which is less than that of the HD signal, but supplementary information such as a transmission control signal and voice information related to band compression is multiplexed to the video signal, and all of 1,125 lines have to be transmitted (recorded/reproduced) when the supplementary information is included, and the number of lines required for transmission of information is more in the MUSE signal than in the HD signal.

According to the present invention, it is made possible to record and reproduce two video signals having different signal formats and also having different numbers of lines and bands required for transmission efficiently and faithfully.

In the embodiment shown in FIG. 1, when the HD signal which is the first video signal is recorded, setting is made so that all of the video effective lines (1,035 lines) required for the transmission at the lowest may be recorded, and, when the MUSE signal which is the second video signal is recorded, setting is made so that all of 1,125 lines required for transmission thereof may be recorded.

Figure 4A:
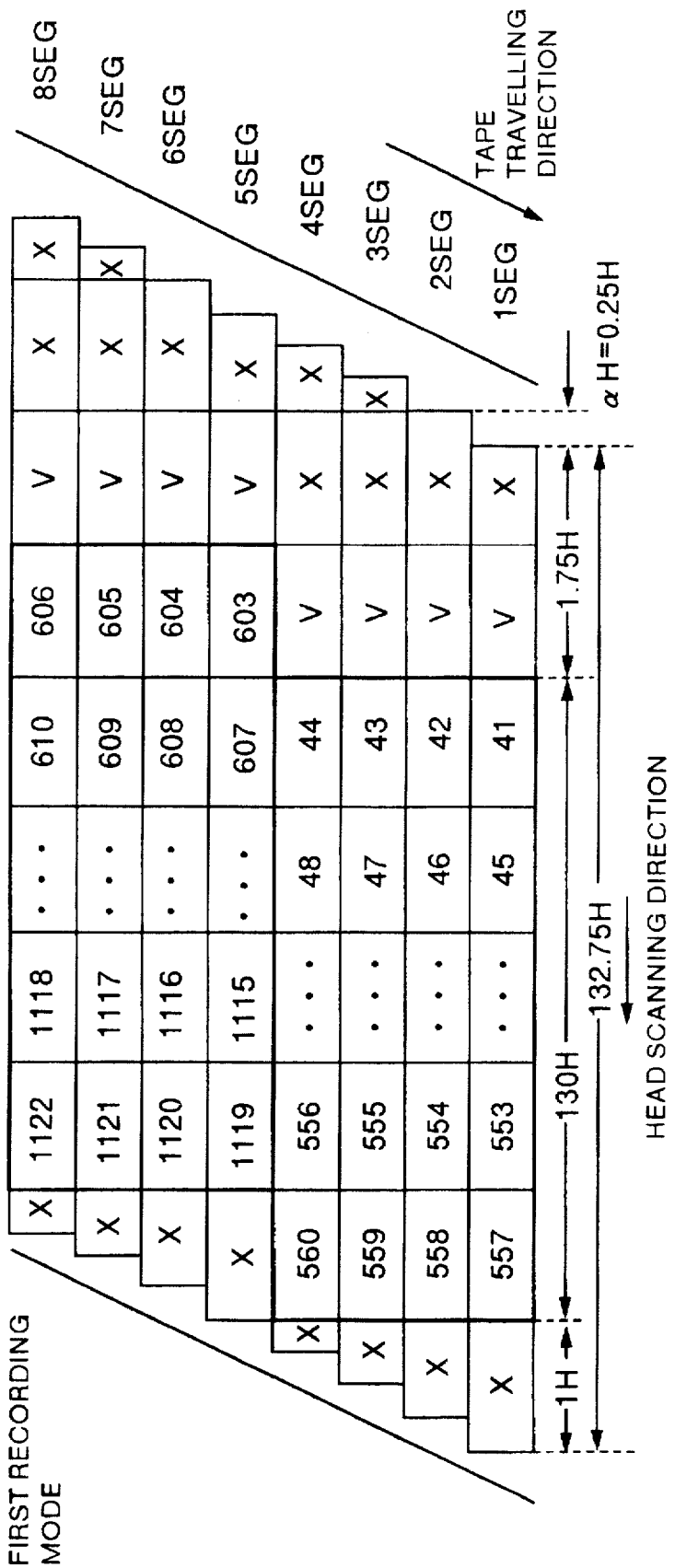
FIG. 4A and FIG. 4B are diagrams showing a first example of a track pattern obtained in the embodiment.

To be concrete, when the HD signal is recorded, lines #41 to #560 and #603 to #1,122 or 1,040 lines in total are recorded as shown in a track pattern in FIG. 4A. It is assumed hereinafter that the number of record lines of the first video signal is n1=1,040. Further, when the MUSE signal is recorded, it is set all of the lines #1 to #1,125 are recorded as shown in a track pattern in FIG. 5A. It is assumed hereinafter that the number of record lines of the second video signal is n2=1,125. By setting the number of record lines as described above, it is possible to reproduce and restore necessary and sufficient video information faithfully even when recording is made in either format of the first video signal or the second video signal.

Further, according to the present invention, as a method of recording these first and second video signals having a wide band, when these signals are recorded by an M channel and N segment division recording system in which a period of one field is divided into M pieces (M is an integral number of 1 or more) of channels and each channel is divided into N pieces (N is an integral number of 1 or more) of segments, thereby to divide into M×N pieces per frame (M×N×2 pieces per frame) of tracks for recording, recording is performed by providing redundant line signals (in concrete terms, redundant signals such as a blanking signal X, a synchronizing signal V, a reference signal R and a supplementary signal S) among those divided video signals. With this, it is possible to restore the original continuous signal faithfully without any error by performing connection processing of divided and reproduced video signals in the period of the redundant signal described above even when an influence by skew caused by what is called expansion and contraction of a tape is exerted.

Besides, in the present embodiment, description will be made assuming a case that the first video signal is recorded by dividing it into one channel and four segments with M1=1 and N1=4, and the second video signal is recorded by dividing it into one channel and two segments with M2=1 and N2=N1/m=2.

Furthermore, in the present invention, assuming that a fundamental frequency of one line of the first record video signal V1 generated by sampling the first video signal is TH1, and the number of sampling S1 per line is set, assuming that a fundamental frequency of one line of the second record video signal V2 generated by sampling the second video signal is TH2, equal to or larger than m times of a number of sampling S2 per line, viz.:

$$S1 \geq S2 \times m,$$

the number of the redundant lines is determined appropriately depending on a case of recording the first video signal and a case of recording the second video signal, a period T1 for recording in each track when the first video signal is recorded is converted into a total number L1 of the lines assuming that the total number of redundant lines per frame when the first video signal is recorded is K1 and the total number of redundant lines per frame when the second video signal is recorded is K2, thus obtaining:

$$T1 = L1 \times TH1$$

$$L1 = (n1 + K1)/(M1 \times N1 \times 2),$$

and further, a period T2 for recording per track when the second video signal is recorded is converted into a total number L2 of the lines, thus obtaining:

$$T2 = L2 \times TH2$$

$$L2 = (n2 + K2)/(M2 \times N2 \times 2).$$

Further, setting is made in both of the above so as to obtain:

$$T1 \times M1 \times N1 = T2 \times M2 \times N2 = 1/fv$$

$$L2 = L1 \times S1/S2 > L/(M1 \times N1 \times 2/m).$$

To be concrete, when the first record video signal is recorded in the present invention, it is set so that 144.75 lines' worth of signals may be recorded during the period of 180 degrees of each track as described later assuming:

$$S1 = 1,700, \ K1 = 118, \ L1 = 144.75.$$

Further, when the second record video signal is recorded, 289.5 lines' worth of signals which is just m(=2) times as many as that of the case of the first record video signal may be recorded during the period of 180 degrees of each track assuming:

$$S2 = S1/m = 850, \ K2 = 33, \ L2 = 289.5.$$

Figure 4B:
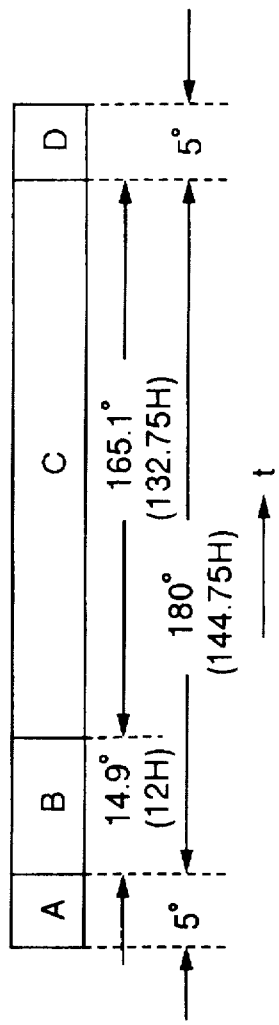
Figure 5A:
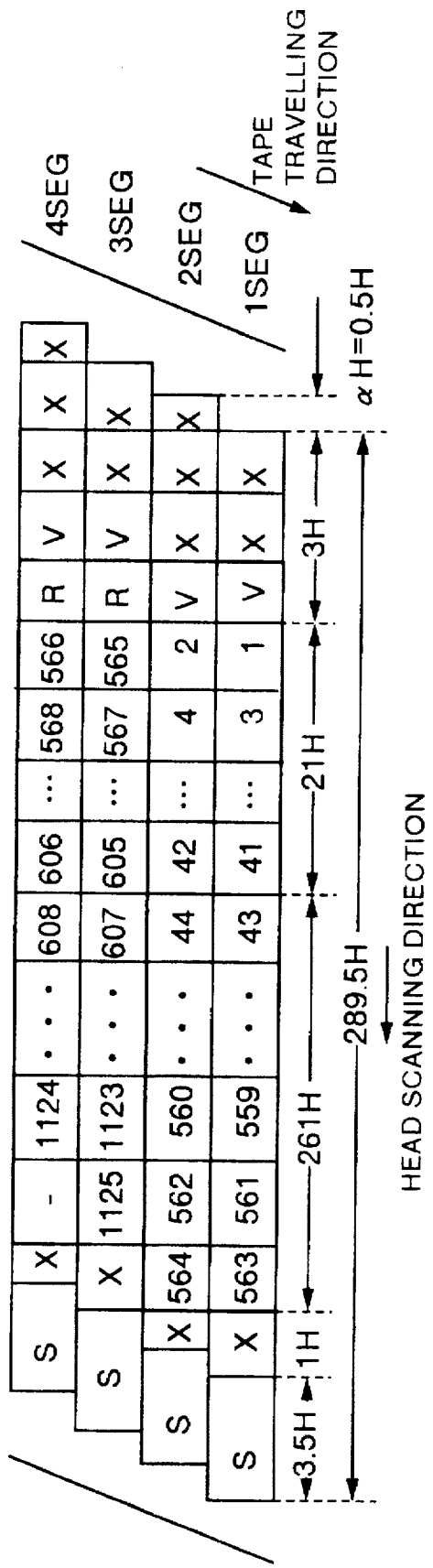
FIG. 5A and FIG. 5B are diagrams showing a second example of a track pattern obtained in the embodiment.
Figure 5B:
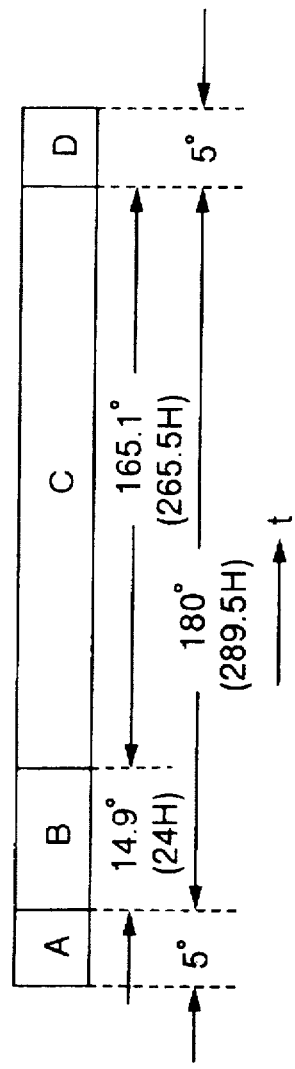

By setting the total numbers L1 and L2 of the lines recordable in each track as described above, it is possible to make the areas where the video signal is recorded on a tape (areas shown at C on the tracks in FIG. 4B and FIG. 5B) almost the same to each other in either case of the first and the second video signals, and it becomes also possible to record voice information inputted accompanying the first and the second video signals, respectively, in almost the same areas on the tape (areas shown at B on the tracks in FIG. 4B and FIG. 5B). Furthermore, by setting the numbers of sampling S1 and S2 per line, it is possible to use the clock used for signal processing in a recording system and a reproducing system in common, thus obtaining an effect that the greater part of the signal processing system can be used in common to both.

The detail of the operation in FIG. 1 will be described with reference to FIG. 2A, FIG. 2B, FIG. 3A, FIG. 3B, FIG. 4A, FIG. 4B, FIG. 5A and FIG. 5B with respect to the case of numeric value examples described above. In FIG. 1, 1a and 1b represent rotary magnetic heads having azimuth angles different from each other. These heads are fitted onto a drum 3 at an angle of 180 degrees with respect to each other and rotated together with the drum 3 by means of the control of a servo control circuit 300. A magnetic tape 6 is made to travel by a capstan 5 by the control of the servo control circuit 300. The magnetic tape 6 is wound around the drum 3 a little over 180 degrees. To be concrete, the tape is wound more by approximately five degrees on the inlet side of the drum and by approximately five degrees also on the outlet side of the drum. As a result, what are called overlap areas shown in areas A and areas D of respective tracks are formed as shown in FIG. 4B or FIG. 5B.

10 represents a mode designating circuit for outputting a recording mode designating signal, and the mode designating circuit 10 outputs a first recording mode designating signal for designating a mode of recording the first video signal from the terminals 12, 13 and 14 and a second recording mode designating signal for designating a mode of recording the second video signal from the terminal 11. The recording mode designating signals from the mode designating circuit 10 are supplied to a video signal record processing circuit 100, a servo control circuit 300 and an FM modulation circuit 40, respectively.

In the video signal record processing circuit 100, when the first recording mode designating signal is supplied in accordance with the recording mode designating signal from the mode designating circuit 10, an HD signal composed of three signals Y, PB and PR from the matrix circuit 30 is supplied as the first video signal and applied with signal processing conversion appropriately, thus generating the first record video signal V1 in one channel. The signal formats of the inputted first video signal HD and the outputted first record video signal V1 are typically shown in FIG. 2A and FIG. 2B, respectively. Similarly, when the second recording mode designating signal is supplied, a MUSE signal processing from the terminal 11 is supplied as the second video signal and applied with signal processing conversion appropriately, thus generating the second record video signal V2. The signal formats of the second video signal MUSE and the outputted second record video signal V2 are typically shown in FIG. 3A and FIG. 3B, respectively.

The first or the second record video signal V1 or V2 generated in and outputted from the video signal record processing circuit 100 is FM modulated in the FM modulation circuit 40, and recorded sequentially thereafter in parallel and oblique tracks of a magnetic tape 6 in one channel by means of the magnetic heads 1a and 1b through a record amplifier circuit 50.

In the servo control circuit 300, when the first recording mode designating signal is supplied in accordance with the recording mode designating signal from the mode designating circuit 10, the numbers of rotation of the rotary magnetic heads 1a and 1b are controlled at 120 r.p.s. and the travel speed of the magnetic tape 6 is controlled so as to show a predetermined speed Vt. Here, as shown in FIG. 4A, respective parameter values are set so that, for example, the tape width of the magnetic tape is ½ inch, a track pitch is 17.5 μm, a track inclination is 5.95 degrees and the tape speed is Vt=40.52 mm/sec so as to be aligned in line unit mutually looking in a perpendicular direction to parallel and oblique tracks formed by recording the first record video signal V1 on the magnetic tape 6. Further, when the second recording mode designating signal is supplied, the number of rotation of the rotary magnetic heads 1a and 1b is controlled at 60 r.p.s. which is half of that in the first recording mode, and the travel speed of the magnetic tape 6 is also controlled so as to travel at a speed ½ of that in the first recording mode, viz.

$$Vt/2=20.26 \text{ mm/sec}$$

With the foregoing, the relative speed of the tape and the head in the second recording mode is set at exactly ½ of the relative speed in the first recording mode. Further, one channel and four segment recording for recording by dividing a period of one field into M1×N1=4 pieces (8 pieces in the period of one frame) of tracks is performed by setting M1=1 and N1=4 in the first recording mode. Whereas, one channel and two segment recording for recording by dividing the period of one field into M2×N2=2 pieces (4 pieces in the period of one frame) of tracks is performed by setting M2=1 and N2=2 in the second recording mode. Moreover, a track pitch (17.5 μm) and a track inclination (5.95 degrees) exactly the same as those in the first recording mode are also obtainable in the second recording mode by the setting described above, thus making it possible to realize picture recording time two times as long as that in the first recording mode by making apparent track pattern the same.

Next, signal processing at time of recording in the video signal record processing circuit 100 will be described with reference to a detailed embodiment shown in FIG. 6. Description will also be made here using concrete numeric values in order to simplify the description.

Figure 6:
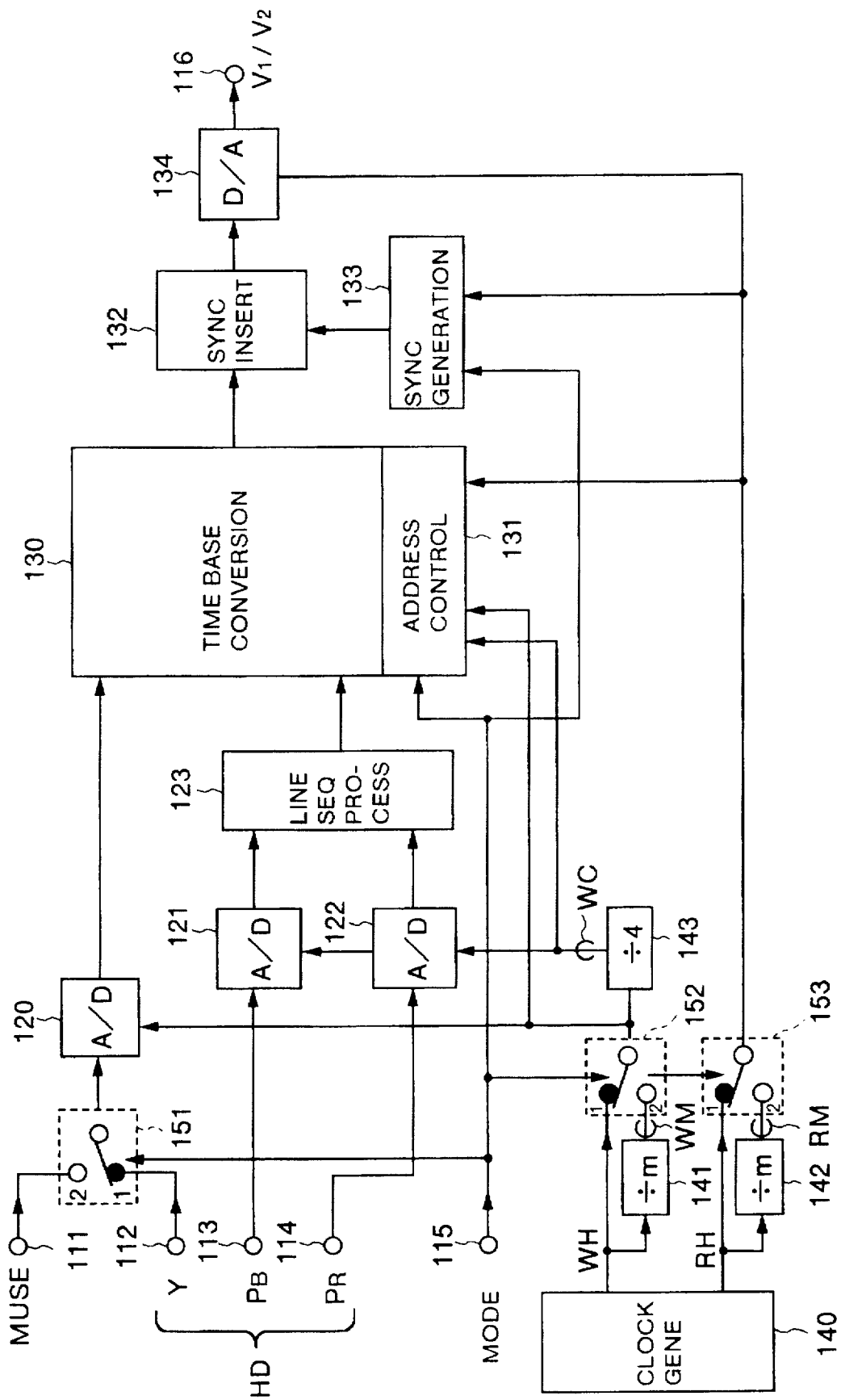
FIG. 6 is a diagram showing an embodiment of a video signal record processing circuit according to the present invention.

In FIG. 6, among the first video signal HD described above, the luminance signal Y is supplied to a terminal 1 side of a switch 151 through a terminal 112, and the color difference signals PB and PR are supplied to AD converters 121 and 122 through terminals 113 and 114, respectively.

Further, the second video signal MUSE is supplied to a terminal 2 side of the switch 151 through a terminal 111. The output of the switch 151 is supplied to an AD converter 120. A clock generating circuit 140 generates a memory write clock WH and a memory read clock RH used in a time base conversion circuit 130. Here, the frequency of the write clock WH (i.e., the frequency of sampling the first video signal HD) is set to:

$$fWH=48.60 \text{ MHz}$$

and the frequency of the read clock RH (i.e., the frequency of sampling the first record video signal V1) is set to:

$$fRH=fWH\times 3,281/2,700=59.058 \text{ MHz}.$$

Besides, although it is not illustrated, the write clock WH is generated synchronously with synchronous information inputted together with the first or the second video signal or synchronous information inputted by a separate system therefrom. Further, the read clock RH is generated using a PLL circuit or the like from the write clock WH so as to satisfy:

$$fRH/fWH=R/W=3,281/2,700$$

with R and W as integral numbers. These write clock WH and read clock RH are supplied to the sides of terminals 1 of switches 152 and 153, respectively.

141 and 142 represent frequency demultipliers for dividing the write clock WH and the read clock RH into 1/m=½, respectively, and the frequency of the clock WM (i.e., the frequency of sampling the second video signal MUSE) and the frequency of the clock RM (i.e., the frequency of sampling the second record video signal V2) of respective outputs are given by:

$$fWH=fWH/m=24.30 \text{ MHz}$$

$$fRH=fRH/m=29.529 \text{ MHz}$$

The clocks WE and RM of respective outputs from the frequency demultipliers 141 and 142 are supplied to the sides of terminals 2 of the switches 152 and 153, respectively.

These switches 151, 152 and 153 are all changed over to the terminal 1 side when the first recording mode is designated, and all changed over to the terminal 2 side when the second recording mode is designated in response to the recording mode designating signal from a terminal 115.

First, in the first recording mode, the luminance signal Y of the first video signal HD is outputted from the switch 151, sampled sequentially by the clock WH having the frequency fWH=48.60 MHz supplied from the switch 152 in the AD converter 120 so as to be converted into a digital signal, and supplied to the time base conversion circuit 130. A number of samples SH per line obtained by sampling the luminance signal Y with the clock WH is given by:

$$SH=fWH/(L\times fv/2)=1,440$$

as shown in FIG. 2A, and only the luminance information on the 1,260 sample of the number of remaining effective picture elements except the horizontal blanking in the number of samples 180 among SH is written sequentially in line unit in the memory of the time base conversion circuit 130.

Further, the color difference signals PB and PR from terminals 113 and 114 are sampled sequentially by a clock WC having the frequency fWH/4=12.15 MHz obtained by dividing the clock WH from the switch 152 into ¼ by a frequency demultiplier 143 and converted into digital signals. The two color difference signals PB and PR outputted from the AD converters 121 and 122 are converted into line sequential signals by a line sequential processing circuit 123, and supplied to the time base conversion circuit 130 as a line sequential color difference signal. The number of samples per line obtained by sampling these line sequential color difference signals PB and PR with the clock WC is given at 1,440/4=360. The color information on 315 samples of remaining number of effective picture elements except horizontal blanking of the number of samples 180/4=45 among the above is written in the memory of the time base conversion circuit 130 in line unit sequentially.

The write in line unit into the memory of the time base conversion circuit 130 is performed as follows. Namely, being address-controlled by an address control circuit 131 based on the write clock WC from the frequency demultiplier 143, a line sequential color difference signal (PB or PR) of 315 samples of the number of effective picture elements 315 per line from the line sequential processing circuit 123 and then 8 samples' worth of YC blanking signal at a predetermined level (corresponding to a zero level of the line sequential color difference signal for instance) are written at a predetermined position of the memory, and further, being address-controlled by the address control circuit 131 based on the write clock WH from the switch 152, the luminance signal Y of 1,260 samples of the number of effective picture elements per line from the AD converter 120 is written into the memory. Thus, as shown in FIG. 2B, a time division multiplex signal of 1,583 samples in total per line obtained by time division multiplexing of 315 samples of the line sequential color difference signal, 8 samples of the YC blanking signal and 1,260 samples of the luminance signal is written in line unit sequentially in the memory.

After the write into the memory of the time base conversion circuit 130 described above is terminated, the read in line unit out of the memory is performed as follows. Namely, the address is controlled by the address control circuit 131 based on the read clock RH having the frequency fRH=59.058 MHz supplied from the switch 153, 315 samples of the line sequential color difference signal, 8 samples of the YC blanking signal and 1,260 samples of the luminance signal are read in this sequence in line unit from the memory, and are read sequentially providing temporary read pause periods so as to generate 117 samples' worth of horizontal blanking periods among those lines. This read output is supplied to a synchronizing signal inserting circuit 132, and negative electrode synchronizing information from a synchronizing signal generating circuit 133 is inserted into the horizontal blanking periods of these 117 samples. In the synchronizing signal generating circuit 133, the first recording mode designating signal from the terminal 115 is received based on the clock RH from the switch 153, and a negative electrode synchronizing information HSI of 117 samples in total formed of 4 samples' worth of front porch signal, 40 samples' worth of negative electrode synchronizing signal, 4 samples' worth of back porch signal, 40 samples' worth of burst signal (to be concrete, a burst signal B1 having a frequency fRH=7.38225 MHz and a repetitive period of 5 cycles) and 29 samples' worth of blanking signal at a predetermined level (corresponding to a zero level of the line sequential color difference signal for instance) is generated as shown in FIG. 2B. This negative electrode synchronizing information HSI is inserted into the horizontal blanking periods of 117 samples of the output from the time base conversion circuit 130 in the synchronizing signal inserting circuit 132, and the output thereof is converted into an analog signal in a DA converter 134 and outputted at a terminal 116 as the first record video signal V1. The first record video signal V1 has a format in which the negative electrode synchronizing information (117 samples), the line sequential color difference signal (315 samples), the YC blanking signal (8 samples) and the luminance signal (1,260 samples) are time division multiplexed as shown in FIG. 2B, and the total number S1 of the samples per line is given at S1=1,700, and a fundamental period TH1 per line is given at:

$$TH1=S1/fRH=28.79 \text{ }\mu s.$$

With this, the total number L1 of the lines which can be recorded in a period T1 of 180 degrees of respective tracks in the first record is given as follows.

$$L1=T1/TH1=FRH/(N1 \times fv \times S1)=144.75$$

Further, in the first recording mode, control of the read sequence and the number of read in line unit is made by the address control circuit 131 in the time base conversion circuit 130, and sequential read is made in the sequence of line numbers shown in FIG. 4A. Namely, among signals of lines #1 to #1,125 per frame of the first video signal HD, signals in odd-numbered lines (signals of the (2n−1)th lines including the color difference signal PR and the luminance signal Y shown in FIG. 2B) are read in the periods of odd-numbered segments (1SEG, 3SEG, 5SEG and 7SEG) where recording is made by the magnetic head 1a. To be concrete, 130 lines in total are read in the order of line numbers #41, #45, . . . , #557 at intervals of four lines in the period of the first segment (1SEG), 130 lines in total are similarly read in the order of lines #43, #47, . . . , #559 at intervals of four lines in the period of the third segment (3SEG), 130 lines in total are read in the order of #603, #607, . . . , #1,119 at intervals of four lines in the period of the fifth segment (5SEG), and further 130 lines in total are read in the order of #605, #609, . . . , #1,121 at intervals of four lines in the period of the seventh segment (7SEG).

Similarly, in the periods of even-numbered segments (2SEG, 4SEG, 6SEG, 8SEG) where recording is made by the magnetic head 1b, signals of even-numbered lines (signals of the (2n)th lines including the color difference signal PB and the luminance signal Y shown in FIG. 2B) are read. To be concrete, 130 lines in total are read in the order of line numbers #42, #46, . . . , #558 at intervals of four lines in the period of the second segment (2SEG), 130 lines in total are read in the order of line numbers #44, #48, . . . , #560 at intervals of four lines in the period of the fourth segment (4SEG), 130 lines in total are read in the order of #604, #608, . . . , #1,120 at intervals of four lines in the period of the sixth segment (6SEG), and further 130 lines in total are read in the order of #606, #610, . . . , #1,122 at intervals of four lines in the period of the eighth segment (8SEG).

Furthermore, when reading is made in unit of each segment described above, a 1.75 lines' worth of blanking signal X having a predetermined level and a redundant signal of one line's worth of segment synchronizing signal V including synchronizing information related to the segment are generated and outputted before and after each segment as shown in FIG. 4A. Besides, the redundant signal is generated in the synchronization generating circuit 133, and inserted before and after the signal in each segment unit outputted from the time base conversion circuit 130 in the synchronization inserting circuit 132.

From the foregoing, the number of effective lines n1 per frame where the first video signal is recorded is given as follows.

$$n1 = 130 \times 8 = 1,040$$

Further, signals of 132.75 lines are recorded in respective tracks including the 2.75 lines' worth of redundant signals in an area of approximately 165 degrees shown at C in FIG. 4B.

On the other hand, since the area where recording can be made in respective tracks is 180 degrees except the overlap periods described above (A and D shown in FIG. 4B), the remaining area of approximately 15 degrees (an area shown at B in FIG. 4B, which is a 12 lines' worth of area calculated in terms of the number of lines) can be secured as the area for recording information other than video signals. In the present invention, for example, a voice signal inputted accompanying the first video signal is recorded in a PCM code system in which the time base is compressed in this area as the information other than the video signal.

Besides, in the first recording mode described above, the total number K1 of redundant lines per frame described above is given as follows.

$$K1 = L1 \times M1 \times N1 \times 2 - n1 = 118$$

Next, in the second recording mode, the second video signal MUSE is outputted from the switch 151, and sampled sequentially by the clock WM having a frequency fWH= 24.30 MHz supplied from the switch 152 so as to be converted into a digital signal in the AD converter 120, and is supplied thereafter to the time base conversion circuit 130. The number of samples SM per line obtained by sampling the MUSE signal with the clock WM is given as shown in FIG. 3A as follows.

$$SM = fWH/(L \times fv/2) = 720$$

All of 720 samples are written sequentially in line unit in the memory of the time base conversion circuit 130. In the second recording mode, no signal is supplied to the time base conversion circuit 130 from the line sequential processing circuit 123, or the signal is disregarded even when it is supplied, and write in the memory is not made.

After write to the memory is terminated, the address is controlled by the address control circuit 131 based on the read clock RM having a frequency fRM=29.529 MHz supplied from the switch 153, samples are read for every 720 samples in line unit out of the memory, and read is made sequentially while providing temporary read pause periods so that 130 samples' worth of horizontal blanking periods are generated among those lines. This read output is supplied to the synchronization inserting circuit 132, and the negative electrode synchronizing information from a synchronization generating circuit 133 is inserted in the horizontal blanking periods of these 130 samples. In the synchronization generating circuit 133, the second recording mode designating signals are received from the terminal 115 based on the clock RE from the switch 153, and a negative electrode synchronizing information HS2 of 130 samples in total formed of 4 samples' worth of front porch signal, 40 samples' worth of negative electrode synchronizing signal, 4 samples' worth of back porch signal, 40 samples' worth of burst signal (to be concrete, a burst signal B2 having a frequency fRM/8= 3.691125 MHz and a repetitive period of 5 cycles) and 42 samples' worth of blanking signal at a predetermined level (corresponding to the zero level of the color difference signals R-Y and B-Y for instance) is generated as shown in FIG. 3B. This negative electrode synchronizing information HS2 is inserted into the horizontal blanking period of 130 samples of the output from the time base conversion circuit 130 in the synchronization inserting circuit 132, the output thereof is converted into an analog signal in a DA converter 134 and outputted at the terminal 116 as the second record video signal V2. The second record video signal V2 is a signal of a format in which the negative electrode synchronizing information (130 samples) and the MUSE signal (720 samples) are time division multiplexed in line unit as shown in FIG. 3B, and the total number S2 of the number of samples per line is given as:

$$S2 = 850 = S1/m$$

and the fundamental frequency TH2 per line is given as:

$$TH2 = S2/fRH = 28.79 \ \mu s = TH1.$$

With this, the total number L2 of the lines that can be recorded in the period T2 of 180 degrees of each track in the second recording mode is given as:

$$L2 = T2/TH2 = fRM/(N2 \times fv \times S2) = 289.5 = L1 \times m$$

Furthermore, this second record video signal V2 is a signal of a format in which the negative electrode synchronizing information (HS2), the line sequential color difference signals (B-Y, R-Y) and the luminance signal (Y) are time division multiplexed, and a signal resembling closely to the first record video signal V1 is obtained.

Further, also in the second recording mode, control of the read sequence and the number of read in line unit is made by the address control circuit 131 in the time base conversion circuit 130 similarly to the first recording mode, and signals are read sequentially in the order of line numbers shown in FIG. 5A similarly to the first recording mode. Namely, in the periods of odd-numbered segments (1SEG, 3SEG) where signals are recorded by the magnetic head 1a among signals of lines #1 to #1,125 per frame of the second video signal MUSE, signals of odd-numbered lines (signals of the (2n−1)th line including the color difference signal R-Y and the luminance signal Y shown in FIG. 3B) are read. To be concrete, 282 lines in total are read sequentially at intervals of two lines in the order of line numbers #1, #3, . . . , #563 in the first segment period (1SEG), and 281 lines in total are read at intervals of two lines in the order of #565, #567, . . . , #1,125 in the third segment period (3SEG).

Similarly, signals of even-numbered lines (signals of the (2n)th line including the color difference signal B-Y and the luminance signal Y shown in FIG. 3B) are read in the periods of even-numbered segments (2SEG, 4SEG) where recording is made by the magnetic head 1b. To be concrete, 282 lines in total are read at intervals of two lines in the order of line numbers #2, #4, . . . , #564 in the second segment period (2SEG), and 280 lines in total are read at intervals of two lines in the order of line numbers #566, #568, . . . , #1,124 lines in the fourth segment period (e4SEG).

Furthermore, when read is made in every segment unit, 7.5 (or 8.5) lines' worth of redundant signals in total such as 3.5 lines' worth of supplementary signal S including supplementary information such as an identification signal and one line portion's worth of reference signal R are generated and outputted before and after each segment in addition to three lines' worth of blanking signal X having a predetermined level and one line's worth of segment synchronizing signal V including synchronizing information related to the segments as shown in FIG. 5A. It is exactly the same as the first recording mode in points that the redundant signal is generated in the synchronization generating circuit 133 and is inserted before and after each signal in segment unit outputted from the time base conversion circuit 130 by the synchronization inserting circuit 132.

With this, the number n2 of effective lines per frame where the second video signal is recorded is given as:

n2=1,125 and all the lines of the second video signal are recorded.

As set forth in the materials of Telecommunication Technical Council described previously, line numbers #43 to #564 and #605 to #1,125 of the second video signal MUSE include signals related to video information. The signals related to the video information are recorded in the area of approximately 165 degrees shown at C in FIG. 5 (almost the same area as C shown in FIG. 4B in the case of the first recording mode) together with the redundant signal described above.

Further, signals related to voice information are included in line numbers #3 to #42 and #565 to #604 other than those described above, and these signals are recorded in the remaining area of approximately 15 degrees (an area shown at B in FIG. 5B, which is almost the same as B in FIG. 4B in the case of the first recording mode).

Thus, according to the present invention, it is possible to record the video information and the voice information in almost the same areas of respective tracks having these informations correspond to each other in the first recording mode and the second recording mode, thus obtaining similarity of track patterns, thereby to produce an effect that recording positions of the video information and the voice information can be identified easily.

Besides, as it is apparent from the comparison between FIG. 4A and FIG. 5B, by setting respective parameters described above, a shift quantity $\alpha H$ of the track among segments at respective track end portions (what is called H row) are $\alpha H=0.25$ H in the first recording mode and $\alpha H=0.5$ H in the second recording mode assuming that the period of one line of the record video signal on the track is 1H, but values obtained by converting the H row into a track length become equal to each other in both modes. Further, in either case, it is possible to have signals stand in a row in line unit between adjacent tracks looking in a lengthy direction of the track and perpendicularly, thus obtaining similarity of the track patterns in this respect, too.

As described above, according to the present invention, it is possible to provide a recording and reproducing apparatus in which a time division multiplexed signal (the first record video signal V1 and the second record video signal V2) having the same fundamental frequency (TH1=TH2) and signal forms are made to resemble closely can be obtained comparatively easily, and almost equal picture quality performance in accordance with the difference of the band in both of them is obtainable from two video signals (the HD signal and the MUSE signal) having entirely different bands and signal formats by using the greater part of the clock generating circuit 140 of the video signal record processing circuit 100, the AD converter 120, the time base conversion circuit 130, the address control circuit 131, the synchronization generating circuit 133, the synchronization inserting circuit 132, the DA converter 134 or the like in common.

Figure 7:
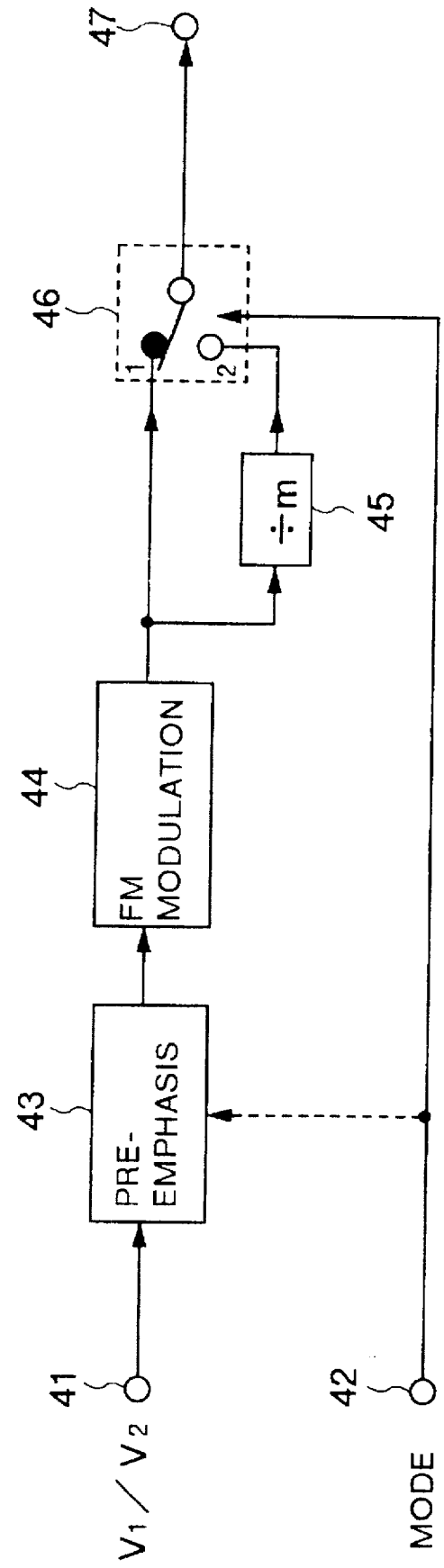
FIG. 7 is a diagram showing an embodiment of an FM modulation circuit according to the present invention.

Next, an embodiment of the FM modulation circuit 40 is shown in FIG. 7. In FIG. 7, the first record video signal V1 or the second record video signal V2 from the video signal record processing circuit 100 is supplied to a preemphasis circuit 43 through a terminal 41 and is supplied further to an FM modulator 44 after appropriate preemphasis processing, and applied with FM modulation at an allocation of a predetermined frequency. The FM output from the FM modulator 44 is supplied to the terminal 1 side of a switch 46, and is supplied to the terminal 2 side of the switch 46 after being divided into 1/m (½) by a frequency demultiplier 45. The switch 46 is changed over to the terminal 1 side when the first recording mode is designated, and is changed over to the terminal 2 side when the second recording mode is designated in response to a recording mode designating signal supplied from the mode designating circuit 10 through the terminal 42. Therefore, in the first recording mode, an output applied with FM modulation by the FM modulator 44 based on the first record video signal V1 inputted from the terminal 41 is changed over by the switch 46 and outputted to a terminal 47. Further, in the second recording mode, an output applied with FM modulation by the FM modulator 44 based the second record video signal V2 inputted from the terminal 41 and divided into half by the frequency demultiplier 45 is changed over by the switch 46 and outputted to the terminal 47. Besides, it may also be arranged so that parameters related to emphasis characteristics of the preemphasis circuit 43 are changed over appropriately depending on the first and the second recording modes in accordance with the recording mode designating signal from the terminal 42.

On the other hand, in the servo control circuit 300, the relative speed of the tape and the head in the second recording mode is controlled so as to reach just 1/m (=½) of the relative speed in the first recording mode.

In the second recording mode, the frequency of an FM signal outputted from the FM modulation circuit 40 is set to just 1/m (=½) of the frequency of the FM signal in the first recording mode by the operation of the frequency demultiplier 45. As a result, a record wavelength of an FM signal in which the output from the FM modulation circuit 40 is recorded on the tape 6 by the magnetic heads 1a and 1b through a record amplifier circuit 50 can be made exactly the same both in the first recording mode and in the second recording mode.

Accordingly, it is possible to secure almost the same magnetic record characteristics in both of these two modes, and also to obtain almost equal picture quality performance in accordance with the bands in both modes. Further, it is possible to use the greater part of the FM modulation circuit 40 and the record amplifier circuit 50 in common in these two modes, and moreover, the magnetic heads 1a and 1b can be used in common in both modes. Hence, the scale of the circuit system can be reduced, and large economical effect is obtainable.

Besides, in recording modes described above, a control signal RCTL is outputted from the servo control circuit 300, and recorded in a control track on the magnetic tape 6 by the control head 4 through the terminal R side of a switch 90. This control signal RCTL is a signal having the same frequency both in the first and the second modes, in concrete terms, 30 Hz which is same as a frame frequency of the first and the second video signals.

Next, the operation at time of reproduction will be described with reference to FIG. 1. The control signal is used as a signal for discriminating whether the signals have been recorded in the first recording mode or they have been recorded in the second recording mode in addition to that the control signal is used for tracking control at time of reproduction. Namely, a control signal PCTL reproduced from a control track on the magnetic tape 6 by the control head 4 is supplied to the servo control circuit 300 as a tracking control signal through a terminal P side of the switch 90, and is also supplied to a mode identification circuit 20, this identifying the recording mode described above. At time of reproduction, either one of a first reproduction mode for setting the tape speed to Vt and the number of head rotation to 120 rps so that the relative speed of the tape and the head same as those in the first recording mode is obtained, or a second reproduction mode for setting the tape speed to Vt/2 and the number of head rotation to 60 rps so that the relative speed of the tape and the head same as those in the second recording mode is set in the servo control circuit 300. Here, the second reproduction mode is set at the beginning for instance.

In case the second record video signal V2 recorded in the second recording mode is reproduced when the second reproduction mode is set, the tape speed becomes the same in recording and reproduction. Therefore, a control signal PCTL having the frequency of 30 Hz which is the same as that when recorded is reproduced from the control track. In case the first record video signal V1 recorded in the first recording mode is reproduced, however, the tape speed is different between recording and reproduction and the signal V1 is reproduced at a tape speed which is a half of that at time of recording. Thus, the control signal PCTL is reproduced as a signal of 15 Hz which is ½ of 30 Hz. In such a manner, it is identified in the mode identification circuit 20 in which mode of the first or the second recording mode the signal is recorded depending on the difference of the frequency of the reproduced control signal PCTL. When the first record video signal V1 has been recorded, a first reproduction mode designating signal designating the first reproduction mode is outputted, and, when the second record video signal V2 has been recorded, a second reproduction mode designating signal designating the second reproduction mode is outputted from the mode identification circuit 20. Besides, at a part in neither of the modes, e.g., a part where the signal has not been recorded, the initial second reproduction mode is set and the second reproduction mode designating signal is outputted, or the reproduction mode which has been set until immediately before is held and the mode designating signal is outputted. In the servo control circuit 300, setting of the first or the second reproduction mode is made in response to the first or the second reproduction mode designating signal from the mode identification circuit 20, respectively.

Similarly, in case the first record video signal V1 recorded in the first recording mode is reproduced when the first reproduction mode is originally set at time of reproduction, reproduction is made at a tape speed same as that when recorded. Thus, a control signal PCTL having a frequency 30 Hz same as that at time of recording is reproduced. Whereas, when the second record video signal V2 recorded in the second recording mode is reproduced, reproduction is made at a tape speed two times as high as that at time of recording. Thus, a control signal PCTL having a frequency of 60 Hz which is twice as high as 30 Hz is reproduced.

Accordingly, it is possible to identify in which mode, the first or the second, the signal V2 has been recorded by the difference of the frequency of the reproduced control signal PCTL in this case, too.

The first or the second recording mode is identified as described above, and a first reproduced video signal V1' (FIG. 2B) or the second reproduced video signal V2' (FIG. 3B) reproduced with the magnetic heads 1a and 1b is amplified by a reproduction amplifier circuit 60, FM-modulated by an FM demodulation circuit 70 and diemphasis-processed appropriately thereafter, and the output thereof is processed for reproduction in a video signal reproduction processing circuit 200. In the video signal reproduction processing circuit 200, when the first reproduction mode designating signal is supplied from the mode identification circuit 20, processing reverse to the record processing for the HD signal of the video signal record processing circuit 100 is performed, the original HD signal (FIG. 2A) composed of the luminance signal Y and color difference signals PB and PR are restored from the first reproduction video signal V1', and original three primary color signals R, G and B are restored from the HD signal by a matrix circuit 80 and outputted to terminals 22, 23 and 24, respectively, as a first video signal U1. Further, in the video signal reproduction processing circuit 200, when the second reproduction mode designating signal is supplied from the mode identification circuit 20, processing reverse to record processing for the MUSE signal of the video signal record processing circuit 100 is performed, and the original MUSE signal (FIG. 3A) is restored from the second reproduction video signal V2' and outputted to a terminal 21 as a second video signal U2.

Next, signal processing at time of reproduction in the video signal reproduction processing circuit 200 will be described with reference to a detailed embodiment shown in FIG. 8.

Figure 8:
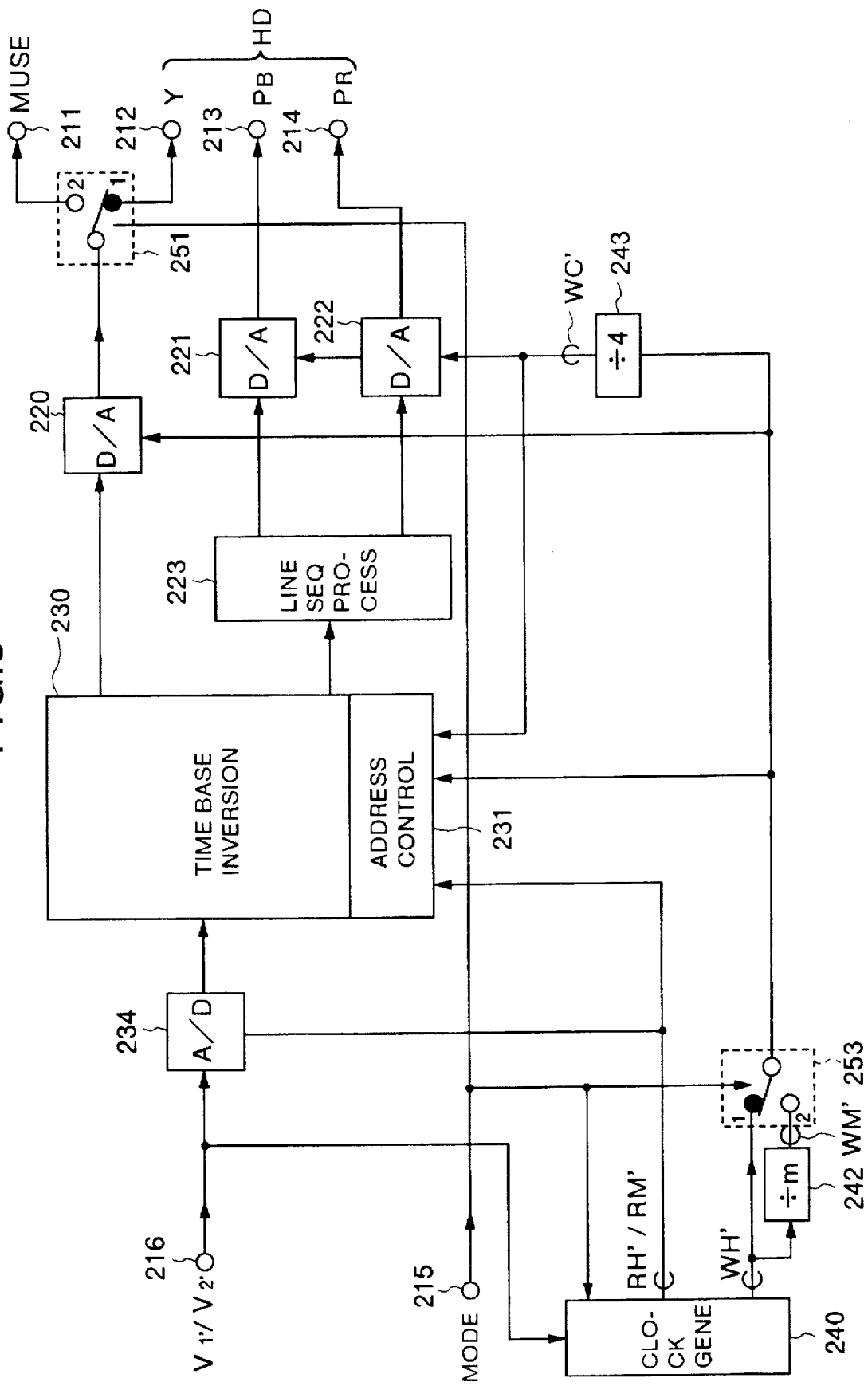
FIG. 8 is a diagram showing an embodiment of a video signal reproduction processing circuit according to the present invention.

In FIG. 8, the first reproduction video signal V1' or the second reproduction video signal V2' from the FM demodulation circuit 70 is supplied to an AD converter 234 and a color generating circuit 240 through a terminal 216.

First, when the first reproduction mode is identified in the mode identification circuit 20 and the first reproduction video signal V1' is supplied, a clock RH' having a frequency fRH'=59.058 MHz same as that of the clock RH of the video signal record processing circuit 100 is generated in the clock generating circuit 240 based on a burst signal (B1 in FIG. 2B) having a frequency of 7.38225 MHz included in the first reproduction video signal V1' and by multiplying the frequency by eight in response to the first reproduction mode designating signal supplied from the mode identification circuit 20 through the terminal 215. This clock RH' is supplied to the AD converter 234 and to an address control circuit 231 as a write clock for the AD converter 234 and the memory of a time base inversion circuit 230.

Further, a clock WH' having a frequency fWH'=48.60 MHz same as the clock WH of the video signal record processing circuit 100 is generated from the clock generating circuit 240 and supplied to the address control circuit 231 as a read clock of the memory of the time base inversion circuit 230 through the terminal 1 side of a switch 253 in the first reproducing mode.

The first reproduction video signal V1' is sampled sequentially in the AD converter 234 and converted into a digital signal by the clock RH' from the clock generating circuit 240, and is written sequentially in line unit in the memory of the time base inversion circuit 230. The write into the memory in line unit is controlled by the address control circuit 231 based on the clock RH', only the luminance signal Y and line sequential color difference signals PB and PR shown in FIG. 2B among the first reproduction video signal V1' are written in the memory, and the synchronizing information HS1, a blanking signal X, a segment synchronizing signal V or the like other than the above are removed without being written.

After the write into the memory of the time base inversion circuit 230 is terminated, the luminance signal Y and the line sequential color difference signals PB and PR are read in line unit one after another from the memory in a predetermined time series order based on the clock WH' outputted from the clock generating circuit 240. This read luminance signal Y is converted into an analog signal in a DA converter 220 based on the clock WH' from the switch 253, and is outputted thereafter to a terminal 212 through a terminal 1 side of a switch 251. Further, the read line sequential color difference signal PB and PR are converted into simultaneous color difference signals PB and PR in a line sequential processing circuit 223, converted into analog signals thereafter based on a clock WC' obtained by dividing the clock WH' from the switch 253 into ¼ by a frequency demultiplier 243 in DA converters 221 and 222, and outputted to terminals 213 and 214, respectively. The luminance signal Y and the color difference signals PB and PR outputted to the terminals 212, 213 and 214, respectively, are those signals that have the same format as that of the first video signal HD (FIG. 2A), and the number of effective lines thereof is 1,040 lines in total per frame in #41 to #560 and #603 to #1,122.

Similarly, a second reproduction mode is identified in the second reproduction mode identification circuit 20, and, when the second reproduction video signal V2' is supplied, a clock RM' having a frequency:

fRM'=29.529 MHz=fRH'/m which is the same as the frequency of the clock RM of the video signal record processing circuit 100 is generated based on a burst signal (B1 in FIG. 3B) having a frequency of 3.691125 MHz included in the second reproduction video signal V2' and by multiplying this signal by eight in the clock generating circuit 240. This clock RM' is supplied to the AD converter 234 and the address control circuit 231 as a write clock of the memory of the time base inversion circuit 230.

Further, in the second reproduction mode, a clock WM' having a frequency:

fWM'=fWH'/m=24.30 MHz obtained by dividing the clock WH' outputted from the clock generating circuit 240 into 1/m(=½) by the frequency demultiplier 242 is changed over by the switch 253 and supplied to the DA converter 220 and the address control circuit 231 as a read clock of the memory of the time base inversion circuit 230 from the terminal 2 side of the switch 253.

The second reproduction video signal V2' is sampled sequentially and converted into a digital signal in the AD converter 234 by the clock RM' from the clock generating circuit 240, and written into the memory of the time base inversion circuit 230 in line unit one after another. The write into the memory in line unit is controlled by the address control circuit 231 based on the clock RM', only the positive electrode synchronizing signal HS, the color difference signals B-Y and R-Y and the luminance signal Y shown in FIG. 3B among the second reproduction video signal V2' are written in the memory, and the synchronizing information HS2, the blanking signal X, the segment synchronizing signal V, the supplementary signal S, the reference signal R or the like other than the above are removed without being written in the memory.

After the write in the memory of the time base inversion circuit 230 is terminated, the digital signal is read sequentially in a predetermined time series order in line unit out of the memory based on the clock WM' outputted from the switch 253, and is changed over by the switch 251 after converted into an analog signal based on the clock WE' from the switch 253 in the DA converter 220, and outputted to the terminal 211 through the terminal 2 side of the switch 251. The signal outputted at the terminal 211 is a signal (FIG. 3A) having the same format as that of the second video signal MUSE, and the number of effective lines is 1,125 lines in total in #1 to #564 and #565 to #1,125 per frame, thus restoring all the lines including the voice information of the MUSE signal.

According to the present invention, it is possible to make the fundamental period TH1 of one line of the first reproduction video signal V1' shown in FIG. 2B and the fundamental period TH2 of one line of the second reproduction video signal V2' shown in FIG. 3B equal to each other, and moreover, the number of samples of respective lines is given by the relationship of just 2:1 or 1,700 to 850, respectively. On the other hand, the relationship between the clock RH' and the clock RM' in the video signal reproduction processing circuit 200 is also set to:

fRH':fRM'=2:1 similarly to the above. Accordingly, it is possible to apply processing of time base inversion in line unit in the time base inversion circuit 230 in common in both the first and the second reproduction modes, and the greater part of the video signal reproduction processing circuit 200 can be used in common as shown also in FIG. 8. Moreover, since it is possible to use the greater part of a reproduction system such as the magnetic heads 1a and 1b, a reproduction amplifier circuit 60 and an FM demodulation circuit 70 in common, it is possible to reduce the scale of the circuit system by sharing in a reproduction system in the same manner as a recording system, thus producing a remarkable economical effect.

Further, as described above, track patterns having the same track pitch and track inclination are obtained in the first recording mode and the second recording mode thereby to realize recording for many hours, and they can be aligned in line unit between adjacent tracks. Accordingly, it is possible to reduce crosstalk disturbance from an adjacent track, thus obtaining an effect to make variable speed reproduction easier. Further, as shown in FIG. 4B and FIG. 5B, the area C for recording a video signal in both modes and the area B for recording a voice signal can be made almost the same on the track. Thus, it is possible to secure new areas shown at A or D in FIG. 4B and FIG. 5B in common, and it is also possible to realize a function of recording various supplementary information commonly in both modes while increasing use efficiency of the tape in such a manner that another information signal different from the video signal and the voice signal such as a supplementary information signal accompanying the video signal and the voice signal or a control information signal for tracking are recorded in those common areas.

Furthermore, as set forth in the materials of Telecommunication Technical Council mentioned previously, the signal of video effective lines #47 to #562 (and #609 to #1,124) of the second video signal MUSE is decoded as the signal of lines #42 to #567 (and #604 to #1,119) of the first video signal HD, or conversely, the signal of the video effective lines #42 to #557 (and #604 to #1,119) of the first video signal HD is decoded as the signal of lines #47 to #562 (and #609 to #1,124) of the second video signal MUSE. According to the present invention, however, since all of signals of these lines are recorded surely in both modes as described above, it is possible to record and reproduce all of the effective video information required at a minimum for transmission of highly precise information always completely without any missing even when a signal format of either the first video signal HD or the second video signal MUSE is adopted for recording, or even when dubbing recording is repeated between apparatus with either the first video signal or the second video signal. Thus, it is possible to provide a faithful and accurate recording and reproducing apparatus of highly precise video information.

Further, as it is also apparent from a method of recording shown in FIG. 2A, FIG. 2B and FIG. 3A, FIG. 3B, in common with the two recording modes, the first and the second, one signal (the color difference signal PR of the first record video signal V1 or the color difference signal R-Y of the second record video signal V2) of the two line sequential chrominance signals is recorded only by the magnetic head 1a among two magnetic heads 1a and 1b having azimuth angles different from each other, whereas another signal (the color difference signal PB of the first record video signal V1 or the color difference signal B-Y of the second record video signal V2) is recorded only by another magnetic head 1b having a different azimuth angle from the head 1a. In such a manner, two chrominance informations are recorded being separated in advance to magnetic heads having azimuth angles different from each other, and two chrominance informations are identified and separated automatically for reproduction in accordance with the difference in azimuth angles between both. Accordingly, it is no longer required to provide means for identifying line sequential chrominance signal in particular in the process of identification or reproduction and color discrimination becomes easier, thus obtaining an effect of realizing variable speed reproduction easily in particular.

In the embodiment shown in FIG. 1, a case applied to one channel recording using two magnetic heads 1a and 1b has been shown assuming that the values of the parameters related to the number of record channels are both 1 (M1=M2=1). However, the present invention is not limited thereto, but the number of channels and the number of segments are optional, which does not depart from the gist of the present invention.

As an example thereof, when one more system, i.e., magnetic heads 2a and 2b shown with a broken line in FIG. 1 are provided on a drum 3 in addition to the magnetic heads 1a and 1b and two channels are recorded with four heads in total, the azimuth angles of adjacent magnetic heads 1a and 1b and the azimuth angles of 1b and 2b are made different from each other and the azimuth angles of the magnetic heads 1a and 1b opposedly arranged by 180 degrees and the azimuth angles of 2a and 2b are made equal to each other in order to make the azimuth angles different from each other between adjacent tracks. Then, in the first recording mode, the number of rotation of the drum 3 is set to 60 rps and M1=2 and N1=2 are set for the first video signal HD, and recording is made by dividing into M1×N1=4 lines of tracks per field in a two channel and two segment division recording system. Further, in the second recording mode, the number of rotation of the drum 3 is set to 30 rps and M2=2 and N2=N1/m=1 are set for the second video signal MUSE, and recording is made by dividing into M2×N2=2 lines of tracks per field by a two channel and one segment division recording system. At this time, the tape speed in the second recording mode is set to ½ of the tape speed in the first recording mode.

Track patterns in the first and the second recording modes obtained by parameter setting described above are shown in FIG. 9A, FIG. 9B and FIG. 10A, FIG. 10B, respectively. In the case of two channel recording system described above, although it is not illustrated, a record video signal processed in the first and the second recording modes is divided into signals of two channels in the video signal record processing circuit 100 and outputted therefrom. To be concrete, the signals of odd-numbered segments shown in FIG. 4 and FIG. 5 (signals of 1SEG, 3SEG, 5SEG and 7SEG in FIG. 4A and signals of 1SEG and 3SEG in FIG. 5A) are outputted as signals of the first channel (signals of 1CH shown in FIG. 9A and FIG. 10A), and signals of even-numbered segments (signals of 2SEG, 4SEG, 6SEG and 8SEG in FIG. 4A, and signals of 2SEG and 4SEG in FIG. 5A) are outputted as signals of the second channel (signals of 2CH shown in FIG. 9A and FIG. 10A). Further, the FM modulation circuit 40 and the record amplifier circuit 50 are provided in each channel, and, after the divided and outputted record video signal is FM-modulated and record-amplified in each channel, the video signal of the first channel is recorded by the magnetic heads 1a and 1b and the video signal of the second channel is recorded by the magnetic heads 2a and 2b, respectively. At this time, based on the setting of the number of rotation of the drum 3, the video signals of respective channels are recorded after being divided into four segments per frame (1SEG, 2SEG, 3SEG and 4SEG shown in FIG. 9A) in the first recording mode, and are recorded after being divided into two segments per frame (1SEG and 2SEG shown in FIG. 10A). Thus, track patterns shown in FIG. 9A, FIG. 9B and FIG. 10A, FIG. 10B are obtained.

Figure 9A:
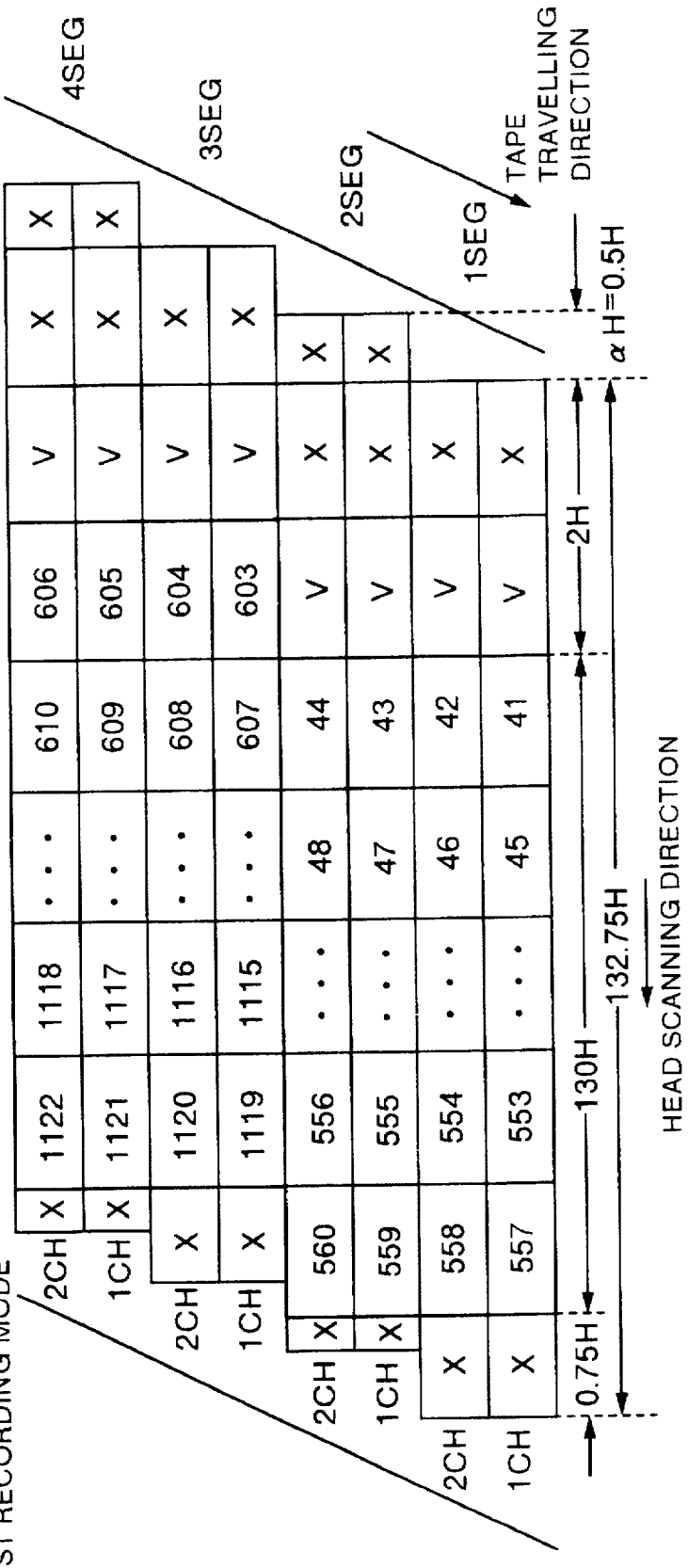
FIG. 9A and FIG. 9B are diagrams showing a third example of a track pattern obtained in the embodiment.
Figure 9B:
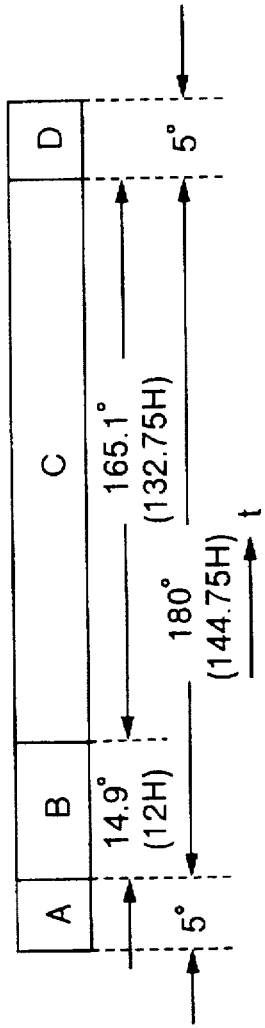

In the present embodiment, the shift quantity (H row) of tracks among segments at track end portions are such that αH=0.5 H in the first recording mode and αH=1.0 H in the second recording mode as shown in FIG. 9A and FIG. 10A, which are just two times of the shift quantities in the previous embodiments (FIG. 4A, FIG. 4B and FIG. 5A, FIG. 5B), but parameters other than the above such as the number of record effective lines per frame, the number of tracks per frame, the number of record lines per track, track pitches and track inclinations are all set to the same values. Accordingly, the record areas on the tracks of video signals and voice signals inputted accompanying therewith in respective modes are exactly similar to those in the case of previous embodiments (FIG. 4B and FIG. 5B), and voice signals are recorded in an area B of the first approximately 15 degrees and video signals are recorded in an area C of remaining about 165 degrees among 180 degrees of respective tracks shown in FIG. 9B and FIG. 10B.

Thus, according to the present invention, it is easy to obtain mutual similarity among record patterns even when the number of channels and the number of segments to be recorded are changed.

Similarly, the present invention is also applicable to a case when the first video signal is recorded in the pattern shown in FIG. 4A or a case when the first video signal is recorded in the pattern shown in FIG. 9A and the second video signal is recorded in the pattern shown in FIG. 5A, and the obtained effects are the same.

As described above, the present invention is generally applicable to a case in which the first video signal is recorded by dividing it into M×N lines of tracks per field and the second video signal is recorded by dividing it into M×N/m lines of tracks per field in accordance with a value of an area ratio m of a first record video signal V1 generated from the first video signal U1 to a second record video signal V2 generated from the second video signal.

The embodiments described above all show a case that m is set to 2. However, the present invention is not limited thereto, but an optional value may be given to m. As an exemplification, even when a signal of a wide band (20 MHz) is inputted as the first video signal U1 as described above and a signal of a narrow band (8 MHz) is inputted as the second video signal U2 as described above for instance, if the first record video signal V1 is generated after limiting the band of the first video signal U1 on an input side in advance so that, in case an occupied band of the second record video signal V2 generated from the second video signal U2 shows 10 MHz for instance, the occupied band of the first record video signal V1 generated from the first video signal U1 also shows 10 MHz, the band ratio m of the first record video signal V1 to the second record video signal V2 becomes almost 1. Thus, m is set to 1. Accordingly, in this case, M1=M2(=M) and N1=N2(=N) are set, and both the first video signal U1 and the second video signal U2 are recorded in M×N lines of tracks by being divided into M channels and N segments per field.

As described above, in the present invention, the parameter m mentioned above is not determined by the ratio of the occupied area latently owned by the inputted first video signal U1 to that owned by the second video signal U2, but is determined optionally in accordance with the ratio of occupied areas of signals (record signals V1 and V2) after converted into signals suitable for recording.

Here, in the present invention, parameters fWH, fRH, fWM and fRM related to the clock frequency and parameters S1 and S2 related to the number of samples per line of the record video signal among respective parameters described above are determined in general so that following relational expressions are effected with W and R as integral numbers.

$$fWM=fWH/m, fRM=fRH/m$$

$$fWH/fRH=fWM/fRM=W/R$$

$$S1=SH \times L \times (R/W)/(2 \times N \times L1) \geq S2 \times m$$

Where, SH is the number of samples per line when the first video signal is sampled with a clock having a frequency fWH as described above, and is given by using the number of scanning lines L per frame and a field frequency fv, as follows.

$$SH=fWH/(L \times fv/2)$$

Next, another embodiment, in which the value of the parameter m mentioned above is set at m=1 in particular and relational expressions described above are satisfied, will be described with reference to FIG. 11A, FIG. 11B and FIG. 12A, FIG. 12B.

Figure 12A:
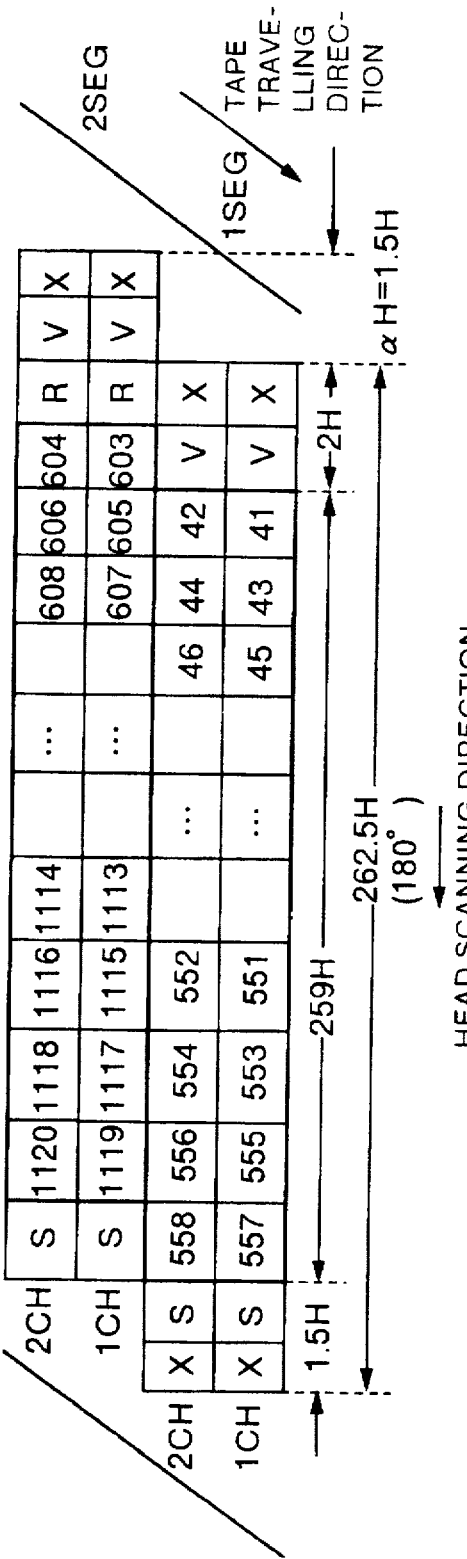
FIG. 12A and FIG. 12B are diagrams showing a fifth example of a track pattern obtained in the embodiment.
Figure 12B:
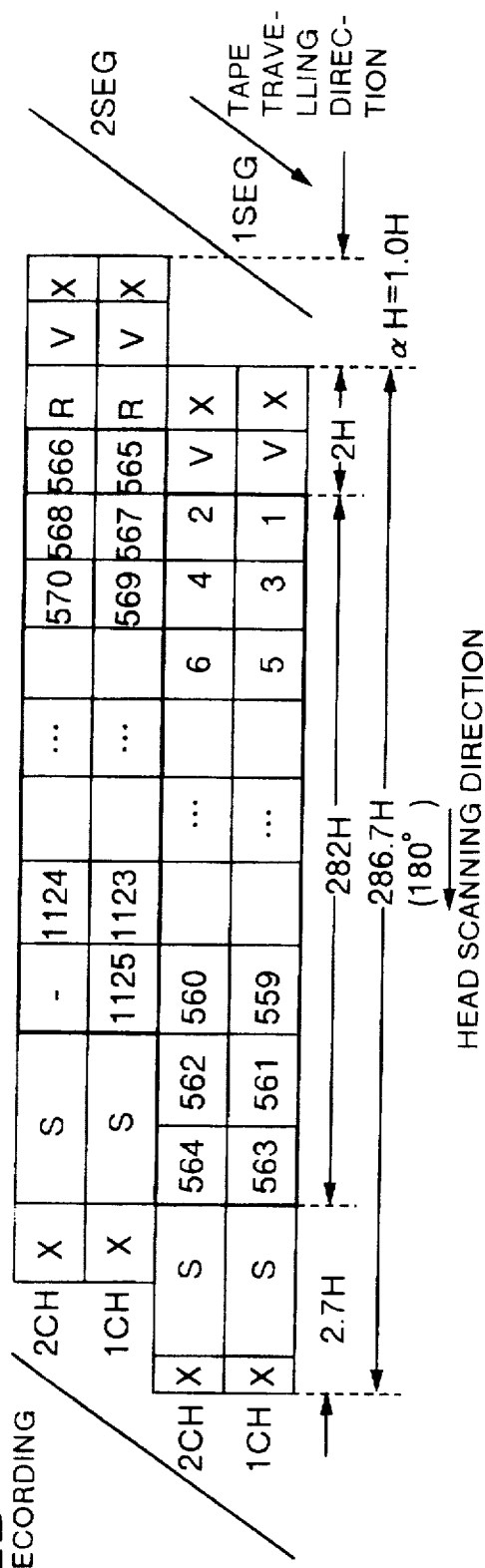

FIG. 11A and FIG. 11B show typically signal formats of the first and the second record signals in every channel generated by using the embodiment shown in FIG. 1 when m=1 is set and furthermore M=2 and N=1 are set, and both signals are recorded in two lines of tracks (4 lines of tracks per frame) by dividing both into two channels and one segment per field. Further, FIG. 12A and FIG. 12B show track patterns obtained in these first and second modes.

In order to generate the first record video signal V1 and the second record video signal V2 shown in FIG. 11A and FIG. 11B, the following are set here as concrete example of numeric values.

$$fWH=fWM=32.40 \text{ MHz}$$

$$fRH=fRM=18.27 \text{ MHz}$$

$$W/R=360/203$$

First, in the first recording mode, SH=960 is set from the above-mentioned relational expressions as the number of samples per line of the first video signal. Luminance information of 840 samples of effective picture elements among these 960 samples except horizontal blanking of 120 samples and chrominance information obtained by forming a line sequence of ¼ thereof or 210 samples are generated. In addition to the luminance information and the chrominance information in every line, totally 102 samples' worth of synchronizing information of 4 samples' worth of front porch signal, 40 samples' worth of negative electrode synchronizing signal, 4 samples' worth of back porch signal, 40 samples' worth of burst signal and 14 samples' worth of blanking signal are added, and 8 samples' worth of YC blanking signal is added further between the luminance information and the chrominance information, thus generating a time division multiplexing signal of S1=1,160 samples per line as the first record video signal V1 as shown in FIG. 11A.

Accordingly, the line fundamental period TH1 is given at TH1=63.49 μs, and the total number L1 of lines which can be recorded in a period T1 of 180 degrees of each track in the first recording mode is given by $$L1=fRH/(N \times fv \times S1)=262.5$$

thus making it possible to record 2×M×N×L1=1,050 line portions per frame.

Here, when a case in which a tape speed Vt=33.35 mm/sec which is equal to that in a system which has been heretofore well known used in an existing home VTR or the like, e.g., a VHS system, is set is considered as a concrete example of a numeric value of the tape speed when the first record video signal V1 is recorded, αH is set to 1.5 H and the track patterns can be formed in an H row between adjacent tracks as shown in FIG. 12A. Thus, it is possible to record all of 1,036 lines including the 1,035 video effective lines (#41 to #557, #603 to #1,120) of the first video signal per frame, and all of 140 line portions per frame of redundant signals such as a blanking signal X, a segment synchronizing signal V, a reference signal R and a supplementary signal S. Besides, in the embodiment shown in FIG. 12A, a track pitch between segments and a track inclination are given at 57.8 μm and 5.97 degrees, respectively, and these values become equal to those in the VHS system described above.

Similarly, in the second recording mode, SM=960 (=SH) is set as the number of samples per line of the second video signal, and totally 102 samples' worth of synchronizing information of 4 samples' worth of front porch signal, 40 samples' worth of negative electrode synchronizing signal, 4 samples' worth of back porch signal, 40 samples' worth of burst signal and 14 samples' worth of blanking signal same as those of the first record video signal described above are added in addition to the all of 960 samples, thus generating a time-division multiplexing signal of S2=1.062 (<S1)

samples per line as the second record video signal V2 as shown in FIG. 11B.

Accordingly, a line fundamental frequency TH2 is given at TH2=58.13 µs (<TH1), and the total number L2 of the lines which can be recorded during a period T2 of 180 degrees of each track in the second recording mode is given by $$L2 = fRM/(N \times fv \times S2) = 286.7$$

thus making it possible to record $2 \times M \times N \times L2 = 1,146$ line portions per frame.

When the tape speed when the second record video signal V2 is recorded is set to Vt=33.35 mm/sec which is the same value as that in the first recording mode, αH=1.6 H is set and the H row between adjacent tracks is shifted slightly in the track pattern, and it is possible to record all lines from #1 to #1,125 of the second video signal per frame and it is further possible to record 21 line portions in total per frame of redundant signals such as the blanking signal X, the segment synchronizing signal V, the reference signal R and the supplementary signal S as shown in FIG. 12B. In the embodiment shown in FIG. 12B, the track pitch and the track inclination between segments also become exactly the same as those in the first recording mode.

Besides, in the embodiment described above shown in FIG. 12A and FIG. 12B, since the voice signal accompanying the video signal is time-division multiplexed on a predetermined line of the second video signal in the second recording mode, the voice signal is recorded along with the second video signal. As against the above, in the first recording mode, it is easy to record the voice signal without occupying a special area for the voice by using a voice recording method which has been heretofore well known such as a method of recording the voice signal by frequency-multiplexing it on the video signal by FM or a method of deep recording by PCM.

As described above, when m=1 is set in particular, both the first video signal U1 and the second video signal U2 can be recorded in a similar signal form and in a similar format such as those shown in the embodiments in FIG. 11A, FIG. 11B and FIG. 12A, FIG. 12B. Therefore, it is possible to have the circuit system be used still more in common with both of them, thus obtaining a large economical effect.

Besides, in this case, two signals having mutually different signal formats are recorded in equivalent occupied bands and in similar formats to both of them, and an identification signal for identifying which format of the signal has been recorded is recorded in a part of the magnetic tape, e.g., a part of the control track, a part of parallel and oblique track on which the video signal is recorded, a part of parallel and oblique track provided separately from the video track, or a part of a track in a longitudinal direction of the tape provided differently from the parallel and oblique track. As an exemplification, the identification signal is recorded with multiplexing in a part of redundant signals shown at V, X, S or R in FIG. 12A and FIG. 12B (or overlap portions shown at A or D in FIG. 4B, FIG. 5B, FIG. 9B and FIG. 10B. By reproducing this identification signal at time of reproducing, such an effect that it becomes easier to restore an original correct signal to the original state faithfully by identifying which form of signal has been recorded is obtainable.

Further, the first and the second video signals which are the objects of the present invention are not limited to the signal having 1,125 scanning lines, but are applicable to video signals in an optional form having 525, 625, 1,050 or 1,250 scanning lines.

As an example thereof, the first video signal is not limited to a highly precise HD signal as described above, but is also applicable, for example, to such a case that a video signal having a narrow band (4 MHz) such as the NTSC system using 525 scanning lines used as the existing television system which is not illustrated is inputted, a pseudo HD signal having a very precisely formed occupied band of approximately 10 MHz corresponding to 1,125 scanning lines is generated and recorded as the first video signal using a scanning line conversion means on the input side and recorded as the first video signal, and the MUSE signal having an occupied band of 8 MHz is recorded as the second video signal. In this case, since the occupied bands of the first record video signal (V1 shown in FIG. 2B or FIG. 11A) generated as the pseudo HD signal and the second record video signal (V2 shown in FIG. 3B or FIG. 11B) generated by the MUSE signal become almost equal to each other, m=1 is set and both signals are recorded in such a format that is shown in the embodiments in FIG. 12A and FIG. 12B, respectively, in this case, an identification signal for identifying which form of signal has been recorded is recorded in a part of the magnetic tape.

Similarly, the second video signal is not limited to the MUSE signal having an occupied band of 8 MHz such as described above, but is also applicable to a case that the pseudo HD signal having an occupied band of 10 MHz generated by the method described above is recorded as the second video signal, and the HD signal having an occupied band of 20 MHz is recorded as the first video signal. In this case, the second video signal (pseudo HD signal) is recorded in a band 1/m as wide as that of the first video signal (HD signal). When it is recorded in a band of 20 MHz without limiting the band of the HD signal, m=2 is set, or, when the band of the HD signal is limited to ½ for instance (or band compression to ½) and the signal is recorded in a band of approximately 10 MHz, m=1 is set. In particular, since it is possible to record and reproduce both the first video signal (an HD signal) and the second video signal (a pseudo HD signal) in an exactly the same band, in the same format (such as a signal format V1 shown in FIG. 11A) and in the same format (such as a format shown in FIG. 12A) in case recording is made by setting m=1 in the latter case, the identification signal for identifying which format of signal has been recorded becomes no longer required in particular in this case.

Furthermore, in the present invention, the video signal to be recorded is not limited to two types of the first and the second video signals only, but is also applicable to a case that a third video signal is recorded selectively with one apparatus other than the first video signal and the second video signal.

For example, the embodiment in which the HD signal of 1,125 scanning lines is inputted as the first video signal, the MUSE signal of 1,125 scanning lines is inputted as the second video signal, and these signals are recorded selectively is as described with reference to FIG. 1, but the NTSC signal of 525 scanning lines is inputted further as the third video signal, and the third video signal is recorded in one channel and one segment by setting a band ratio to the first video signal to m=4 and also setting M3=1 and N3=N1/m=1.

Figure 13:
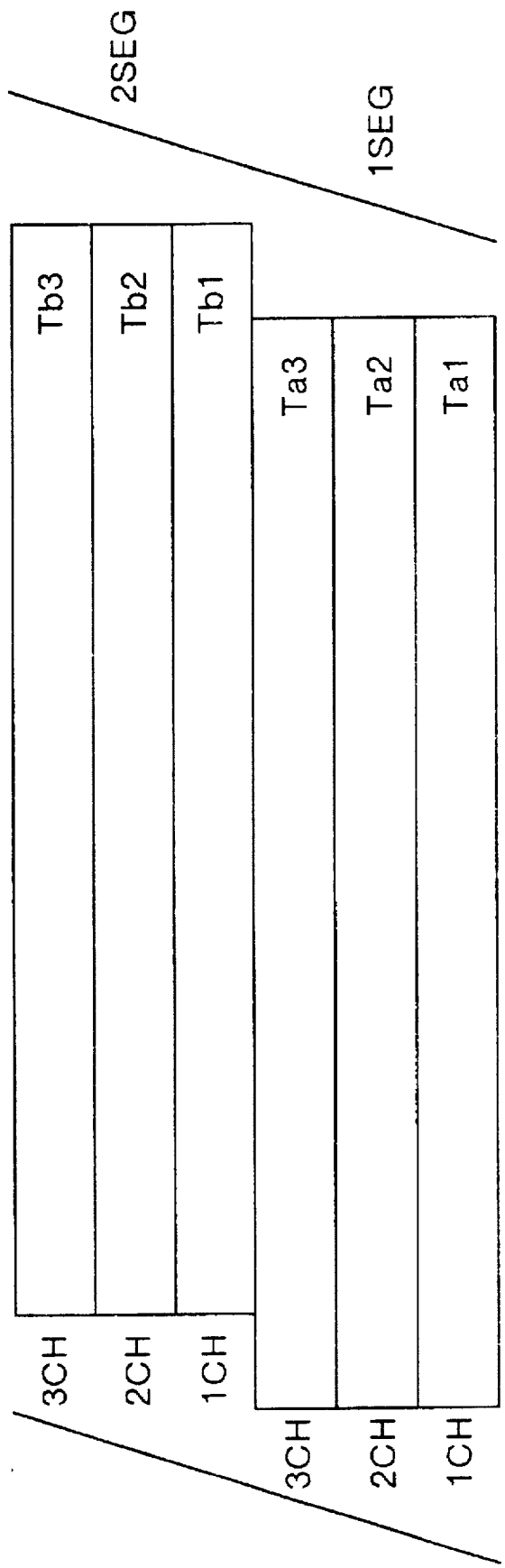
FIG. 13 is a diagram showing a sixth example of a track pattern obtained in the embodiment.

To be more concrete, the first or the second video signal is recorded by being divided into four tracks Ta1, Ta2, Tb1 and Tb2 per frame as shown in a track pattern in FIG. 13 when the signal is recorded in two channels and one segment at M=2 and N=1, and the third video signal is recorded by being divided into two tracks Ta3 and Tb3 per frame.

This third video signal NTSC can be recorded and reproduced by a system which has been heretofore well known which is used in an existing home VTR or the like such as a VHS system. As the conditions for the above, a travelling mechanism system composed of the drum 3, the capstan 5 and the magnetic tape 6 is formed of a mechanism system same as or interchangeable with a conventional home VTR. Under such conditions, the first or the second video signal is recorded and reproduced with the first magnetic heads $1a$, $1b$ (or $2a$, $2b$), and the third video signal is recorded and reproduced by the first magnetic heads $2a$, $2b$ or the second magnetic heads $3a$, $3b$ provided on the drum 3 separately from the first magnetic head by providing a recording and reproducing circuit not illustrated based on the well-known system in a separate system.

Here, these magnetic heads $3a$ and $3b$ cause a speed error having a high frequency in a video signal reproduced by the magnetic heads $1a$ and $1b$ (or $2a$ and $2b$). Such a problem may be solved, taking the timing shown in FIG. 4B as an example, by installing the magnetic heads $3a$ and $3b$ for recording and reproducing the third video signal at positions backed off slightly in the rotating direction from the magnetic heads $1a$ and $1b$ (or $2a$ and $2b$) for recording and reproducing the first and the second video signals on the drum 3 (for example, within the angle of 5+14.9=19.9 degrees on the tracks in the area A and the area B shown in FIG. 4B). Namely, before the first magnetic heads $1a$ and $1b$ (or $2a$ and $2b$) starts scanning of a video area C, the second magnetic heads $3a$ and $3b$ moving therebehind rush onto the tape for scanning. Thus, it is possible to remove the influence by impacting disturbance due to rushing onto the tape of the second magnetic heads $3a$ and $3b$. Similarly, since the second magnetic heads $3a$ and $3b$ are projected for scanning onto the tape after the first magnetic heads $1a$ and $1b$ (or $2a$ and $2b$) complete scanning of the video area C, it is possible to remove the influence by impacting disturbance due to projection onto the tape of the second magnetic heads $3a$ and $3b$ at the same time. In general, by arranging the first and the second magnetic heads in such a relationship that the second magnetic heads $3a$ and $3b$ do not rush in or project for scanning of the magnetic tape 6 while the first magnetic heads ($1a$, $1b$, $2a$, $2b$) are scanning the area C where the video signal is recorded, it is possible to check the influence by the impacting disturbance.

It is an effective method to provide a mechanism for perturbing the head so that, while at least either one of the first or the second magnetic heads is scanning the tape, other heads do not slide the tape by scanning in order to prevent mutual interference among these magnetic heads. Further, even when the first and the second heads are made to slide on magnetic tapes having mutually different abrasion characteristics, it is possible not to have the heads slide on the tape for scanning by means of the mechanism for perturbing the heads when combinations of the tape and the head are different, thus obtaining an operation and an effect of protecting the head and the tape and elongating the life thereof.

According to the embodiment described above, it is possible to have the greater part of the mechanism system for common use, and moreover to reproduce the tape recorded with a conventional home VTR or the like by this apparatus, and it becomes also possible to reproduce an existing video signal interchangeably by one apparatus other than the highly precise video signal described above, thus obtaining an effect that an added value of the apparatus can be increased.

Next, although the embodiment shown in FIG. 1 shows a case that a video signal is recorded in line unit by analog (FM) recording, the present invention is not limited thereto, but is also applicable to a case that the video signal is recorded by PCM-coding in the unit of sampled picture elements of the video signal by what is called digital recording. In the case of analog recording, the values of parameters (such as the number of record lines L1 and L2 and line periods TH1 and TH2) in every track are set in line unit as explained in the embodiment described above, but, in the case of digital recording, the video signal is prescribed by a signal in block unit constituted by the data of a plurality of sampled picture elements.

Namely, in the case of digital recording, the first record video signal in block unit including data of K1 pieces of sampled picture elements per block is generated first from the first video signal in the first recording mode so as to include S1 pieces of sampled picture elements calculated in terms of per line by sampling the first video signal, the first record video signal is divided into M pieces of channels in field unit, each of respective channels is divided into N pieces of segments and divided into M×N pieces per field (M×N×2 pieces per frame) of tracks for digital recording, and $$L1 \times S1 = NB1 \times K1$$

is set so that NB1 pieces' worth of signals calculated in terms of the block number (L1 lines' worth of signals calculated in terms of the number of lines) may be recorded in every track.

Further, in the second recording mode, a second record video signal in block unit including data of K2 pieces of sampled picture elements per block is generated from the second video signal so as to include S2 pieces of sampled picture elements calculated in terms of per line by sampling the second video signal, the second record video signal is divided into M×N/m pieces per field (M×N×2/m pieces per frame) of tracks in accordance with the ratio m of bands or information quantities of the first record video signal to the second record video signal and is recorded digitally, and $$L2 \times S2 = NB2 \times K2$$

is set at the same time so that NB2 pieces' worth of signals calculated in terms of the block number (L2 lines' worth of signals calculated in terms of the line number) may be recorded in every track.

Furthermore, the tape speed when the second record video signal is recorded is set to approximately 1/m times as high as the tape speed when the first record video signal is recorded, and respective parameters described above are also set so as to satisfy $$NB2 = NB1 \times K1 \times K2$$

Besides, in the case of analog recording, the sampled picture elements are generally made to follow a sequence of time series at time of sampling within the line. Whereas, in the case of digital recording, the sequence of time series of the sampled picture elements within the block is generally made different from the order of the time series at time of sampling by what is called an interleave technique. Accordingly, the numbers of record lines per track (L1 and L2) in the case of digital recording are calculated from the numbers of sampled picture elements per line (S1 and S2), the numbers of recorded blocks per track (NB1 and NB2) and the numbers of sampled picture elements (K1 and K2) included per block.

For example, a case that examples of numeric values shown in FIG. 2A, FIG. 2B, FIG. 3A, FIG. 3B, FIG. 4A, FIG. 4B, FIG. 5A and FIG. 5B are applied to digital recording as they are will be described. When K1(=100) pieces' worth of data quantity of sampled picture elements is allocated to the signal in one block for recording (the data quantity per block when quantization is made with eight bits per picture element and a redundancy code such as an error-correcting code corresponding to 10% per block is added becomes 8×K1×1.1=880 bits) in the first recording mode, the number of sampled picture elements in one line of the first record video signal V1 shown in FIG. 2B is S1=1,700 samples. Therefore, when this first record video signal is recorded digitally in the patterns shown in FIG. 4A and FIG. 4B, it is set so that a signal of L1=144.75 line portions calculated in terms of line number and NB1=L1 ×S1/K1=2460.75 piece portions calculated in terms of the block number may be recorded in every track, and 130 lines' worth (2,210 blocks' worth calculated in terms of the block number) of video information among the above is recorded in every track in the example shown in FIG. 4A.

As against the above, when K2(=100) pieces' worth of data quantity of sampled picture elements is allocated to the signal in one block for recording in the second recording mode, the number of sampled picture elements in one line of the second record video signal V2 shown in FIG. 3B is S2=850 samples, and, when the second record video signal is recorded digitally in the patterns shown in FIG. 5A and FIG. 5B, it is set so that L2=289.5 lines' worth of signal calculated in terms of the line number and NB2=L2×S2/K2=2,460.75 (=NB1) pieces' worth of signal calculated in terms of the block number may be recorded in every track, and 282 lines' worth (2,397 block portions calculated in terms of the block number) of video information among the above is recorded in every track in the example shown in FIG. 5A.

Further, in the present invention, it is a matter of course that the objective signal for digital (PCM) recording is not limited to the first or the second video signal only, but is also applicable to a case of digital recording of the third video signal similarly to the case of analog (FM) recording. To be concrete, in the track pattern in FIG. 13 for instance, the first or the second video signal is recorded digitally in tracks Ta1, Ta2, Ta3, Tb1, Tb2 and Tb3 per frame, the third video signal is recorded digitally in tracks Ta3 and Tb3 per frame, and identification signals for identifying these signals are recorded together in a part on the magnetic tape.

Furthermore, the present invention is applicable either when the analog (FM) record and the digital (PCM) record are performed selectively by one apparatus or when both are performed at the same time. To be concrete, in the track pattern shown in FIG. 13 for instance, the first video signal is divided into four tracks Ta1, Ta2, Tb1 and Tb2 per frame and recorded analogically, and the second video signal (or the third video signal) is divided in two tracks Ta3 and Tb3 per frame and recorded digitally. Otherwise, the first video signal is recorded digitally, and the second video signal (or the third video signal) is recorded analogically conversely to the above.

Further, the present invention is also applicable to a case when an apparatus is formed with a part of or the whole of the mechanism system and the heads in common in case the analog (FM) recording or the digital (PCM) recording is performed separately from each other.

To be concrete, in the track pattern shown in FIG. 13 for instance, the first video signal is divided into two channels of tracks Ta1, Tb1 and Ta2, Tb2 per frame, respectively and recorded analogically (FM), by at least the first and the second sets of 4 pieces of heads (1a, 1b and 2a, 2b). Further, for example, supplementary information such as a voice signal accompanying the first video signal is recorded analogically (FM) or digitally (PCM) in one channel in the tracks Ta3 and Tb3 per frame by means of at least the third set of two pieces of heads (3a and 3b) as occasion demands. Here, it is assumed that an FM signal band in case the first video signal is recorded analogically (FM) is W (W =16 MHz for instance).

On the other hand, when a fourth video signal having a signal format different from that of the first video signal (e.g., a video signal obtained by digitally compressing a video signal such as the existing NTSC system or a digitally compressed video signal such as an ATV system which is under investigation at present as a digital television system in the U.S., Europe and so on) is recorded digitally (PCM), it is possible to have the greater part of the mechanism system and heads for common use by setting the record parameters nicely.

Namely, when it is assumed that a transmission rate of the compressed fourth video signal in a digital format is B (B=25 Mbps for instance) including voice information accompanying the signal and code redundancy of supplementary information such as a synchronizing code and an error correcting code required for recording thereof is X%, the transmission rate required for recording the fourth video signal (and the voice information accompanying the signal) in one channel becomes B(1+X). Thus, when the value of the record transmission rate B(HX) is set so that it becomes smaller than approximately two times of the FM signal band W and shows B(1+X)≦2 W, it becomes possible to record the fourth video signal in one channel, and moreover, it is possible to have the greater part of the mechanism system and the heads for recording the first video signal for common use when the code redundancy X is set to approximately 30% or lower for instance. In more concrete terms, it is possible, by setting the record parameters described above, to have the whole mechanism system including the drum 3, the capstan 5 and so on for common use, and to digitally (PCM) record the fourth video signal in the tracks Ta1 and Tb1 per frame in one channel by making the first set of two pieces of heads 1a and 1b (or the second set of two pieces of heads 2a and 2b) serve a double purpose as they are as shown in a track pattern in FIG. 14.

Figure 14:
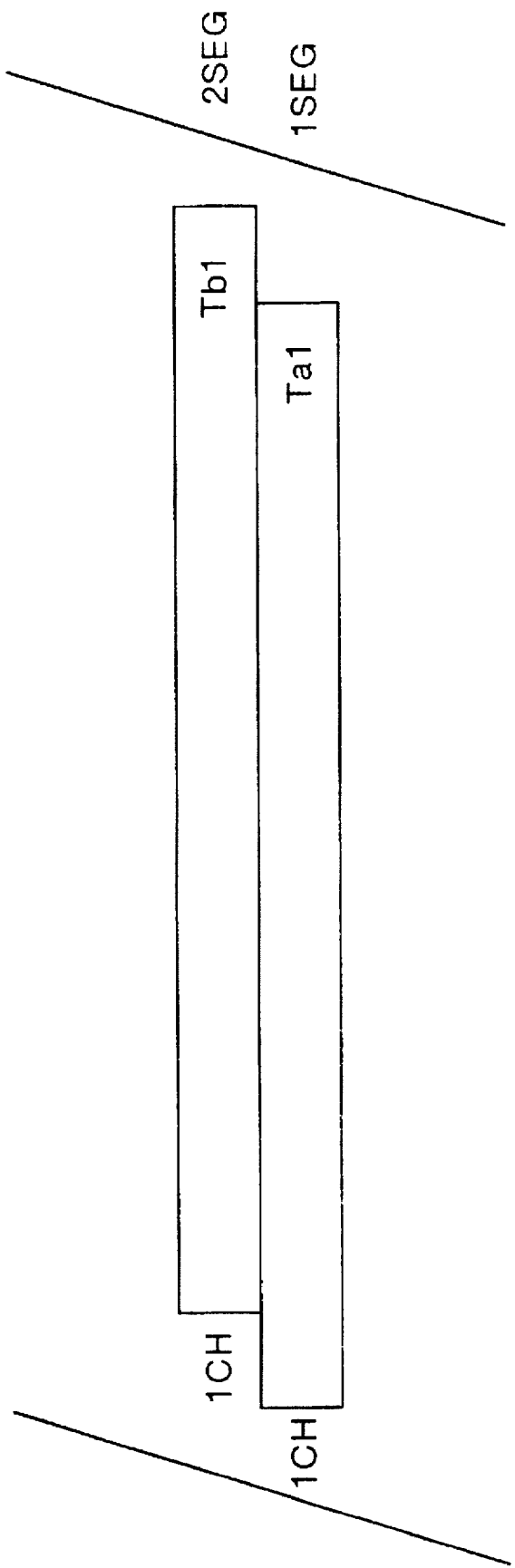
FIG. 14 is a diagram showing a seventh example of a track pattern obtained in another embodiment.

Besides, azimuth angles of respective sets of heads, 1a, 1b, 2a, 2b, 3a and 3b are set so that the azimuth angles for recording differ from each other between adjacent tracks in the track patterns shown in FIG. 13 and FIG. 14. With this, it is possible to record at a high density without providing guard bands among tracks. Further, the track patterns in FIG. 13 and FIG. 14 show a case in which recording is made by setting the widths of the respective heads to an almost same value and the tape speed when the fourth video signal is recorded to approximately ⅓ of the tape speed when the first video signal is recorded. With this, it is possible to record at a high density without providing guard bands among tracks even if the heads are shared, and moreover, such a secondary effect that the recording period of time of the fourth video signal can be increased to three times as long as that of the first video signal is obtainable.

Any of the embodiments described above does not depart from the gist of the present invention. In particular, according to these methods, it is possible to record a plurality of signals of different systems having various picture qualities conforming to use objects very efficiently with a common apparatus and on a common cassette tape.

As described above, according to the present invention, it is possible to record and reproduce a plural types of video signals having mutually different bands, and also having different number of effective scanning lines and signal formats by one apparatus efficiently while checking enlargement of a circuit scale with almost uniform picture quality performance in accordance with the difference in bands. Furthermore, in both analog recording and digital recording, it is possible to realize, against one wide band high picture quality recording function, another narrow band long time recording function with slight increase in cost. Further, it is also possible to obtain track patterns having almost the same track pitch and track inclination so as to record in the same area on the track and to align in line unit between adjacent track in either of recording modes, thus obtaining the effect of reducing crosstalk disturbance and making variable speed reproduction possible. In addition, since all the effective video information required for the transmission of highly precise information at a minimum is recorded and reproduced for certain in either of recording modes, there is no omission of information even when recording or dubbing is repeated in either signal format between apparatus, thus making it possible to provide a recording and reproducing apparatus of always faithful and accurate highly precise picture image information with no missing of information.

We claim:

1. An apparatus for recording a video signal for recording either one of a first video signal and a second video signal including a luminance signal and two chrominance signals and having mutually different signal formats in parallel and oblique tracks on a tape, comprising:

a first signal generating means for generating from said first video signal a first record video signal in a line unit including S1 pieces of sampled picture elements per line by sampling the first video signal in a first recording mode;

a first recording means for processing so that said first record video signal may be recorded while dividing the signal into M×N pieces per field (M×N×2 pieces per frame) of tracks by dividing the signal into M pieces (M is an integral number) of channels in a field unit and dividing each channel into N pieces (N is an integral number) of segments, and L1 lines' worth of signals calculated in terms of the number of lines may be recorded in each track;

a second signal generating means for generating from said second video signal a second record video signal in a line unit including S2 pieces of sampled picture elements per line by sampling the second video signal; and a second recording means for processing so that said second record video signal may be recorded by dividing into M×N/m pieces per field (M×N×2/m pieces per frame) of tracks in accordance with a ratio m of bands of said first record video signal to said second record video signal and L2 lines' worth of signals calculated in terms of the number of lines may be recorded in each track; wherein said respective parameters are set so as to satisfy $$L2=L1\times S1/S2$$

for recording.

2. An apparatus for recording a video signal according to claim 1, wherein said first and second signal generating means are provided with means for processing the signals digitally so that a number S1 of sampled picture elements per line of said first record video signal becomes equal to or larger than m times as many as the number S2 of sampled picture elements per line of said second record video signal so as to show $S1 \geq S2\times m$.

3. An apparatus for recording a video signal according to claim 2, wherein said digital signal processing means is provided with means for outputting a signal obtained by time division multiplexing of a negative electrode synchronizing information including a blanking signal at a predetermined level, a signal obtained by forming a line sequence of two chrominance signals of said first video signal and a luminance signal within a fundamental period of one line of said first record video signal.

4. An apparatus for recording a video signal according to claim 2, wherein said digital signal processing means is provided with means for outputting a signal obtained by time division multiplexing of a negative electrode synchronizing information including a blanking signal at a predetermined level, a signal obtained by forming a line sequence of two chrominance signals of said second video signal and a luminance signal within a fundamental period of one line of said second record video signal.

5. An apparatus for recording a video signal according to claim 2, wherein said digital signal processing means is provided with means for processing while making a frequency for sampling said second video signal 1/m times of a frequency for sampling said first video signal.

6. An apparatus for recording a video signal according to claim 2, wherein said digital signal processing means is provided with means for processing while making a frequency for sampling said second record video signal 1/m times of a frequency for sampling said first record video signal.

7. An apparatus for recording a video signal according to claim 2, wherein said digital signal processing means has means for processing while making the frequency for sampling said first record video signal R/W times (Both R and W are integral numbers) of the frequency for sampling the first video signal, and processes by setting integral numbers S1 and SH satisfying $$S1=SH\times L\times(R/W)/(2\times N\times L1)$$

among said respective parameters assuming that a number of scanning lines per frame of said first video signal is L and that a number of samples per line obtained by sampling said first video signal with said frequency is SH.

8. An apparatus for recording a video signal according to claim 1, wherein recording is performed while setting said respective parameters so as to satisfy $$L2 \geq L\times m/(M\times N\times 2)$$

assuming that a number of scanning lines per frame of said second video signal is L.

9. An apparatus for recording a video signal according to claim 1, wherein said first and second recording means are provided with means for processing so as to record signals of portions including video effective lines of said first record video signal and second record video signal, respectively, in almost the same areas of respective tracks.

10. An apparatus for recording a video signal according to claim 1, wherein said first and second recording means are provided with means for processing so as to record voice information inputted accompanying said first video signal and second video signal in almost the same areas of respective tracks.

11. An apparatus for recording a video signal according to claim 1, wherein said first and second recording means are provided with means for recording while making a tape speed when said second record video signal is recorded approximately ½ times of the tape speed when said first record video signal is recorded.

12. An apparatus for recording a video signal according to claim 1, wherein said first recording means includes first heads and said second recording means includes second heads, said first heads and said second heads being arranged at mutually different angles on a drum.

13. An apparatus for recording a video signal for recording either one of a first video signal and a second video signal having mutually different signal formats in parallel and oblique tracks on a tape, comprising:

a first signal generating means for generating from said first video signal a first record video signal in a block unit including data of K1 pieces of sampled picture elements per block by sampling the first video signal;

a first recording means for processing so that said first record video signal may be recorded digitally while dividing the signal into M×N pieces per field (M ×N×2 pieces per frame) of tracks by dividing the signal into M pieces (M is an integral number) of channels in a field unit and dividing each channel into N pieces (N is an integral number) of segments, and NB1 pieces' worth of signals calculated in terms of the number of blocks may also be recorded in each track;

a second signal generating means for generating from said second video signal a second record video signal in a block unit including data of K2 pieces of sampled picture elements per block by sampling the second video signal; and a second recording means for processing so that said second record video signal may be recorded digitally while dividing the signal into M×N/m pieces per field (M×N×2/m pieces per frame) of tracks and NB2 pieces' worth of signals calculated in terms of the number of blocks may be recorded in each track; wherein said respective parameters are set so as to satisfy $$NB2=NB1\times K1/K2.$$

14. An apparatus for reproducing a video signal from a tape where either one of a first video signal or a second video signal having mutually different signal formats has been recorded on parallel and oblique tracks, comprising:

a reproducing means for reproducing a tape, in which it is processed so that a first record video signal in a line unit including S1 pieces of sampled picture elements per line is generated from said first video signal by sampling it, said first record video signal is recorded while being divided into M×N pieces per field (M×N×2 pieces per frame) of tracks by dividing the first record video signal into M pieces (M is an integral number) in a field unit of channels and dividing each channel into N pieces (N is an integral number) of segments, and L1 lines' worth of signals calculated in terms of the number of lines may be recorded in each track, or it is processed so that a second record video signal in a line unit including S2 pieces of sampled picture elements per line is generated from said second video signal by sampling it, the second record video signal is recorded while being divided into M×N/m pieces per field (M×N×2/m pieces per frame) of tracks in accordance with a ratio m of bands of the first record video signal to the second record video signal and L2 lines' worth of signals calculated in terms of the number of lines may be recorded in each track, and said respective parameters are set so as to satisfy $L2=L1\times S1/S2$, thereby to reproduce a tape where either one of said first or second record video signal has been recorded;

an identification means for identifying whether either one of said first or second record video signal has been recorded; and means for processing said first or second record video signal reproduced from said reproducing means in response to the output from said identification means, and restoring and outputting a signal having the same format as that of said first video signal when reproduction of said first record video signal is identified or restoring and outputting a signal having the same format as that of said second video signal when reproduction of said second record video signal is identified.

15. An apparatus for reproducing a video signal for reproducing a tape where either one of a first video signal or a second video signal having mutually different signal formats has been recorded on parallel and oblique tracks, comprising:

a reproducing means for reproducing a tape, in which it is processed so that a first record video signal in a line unit including data of K1 pieces of sampled picture elements per block is generated from said first video signal by sampling it, said first record video signal is recorded digitally while being divided into M×N pieces per field (M×N×2 pieces per frame) of tracks by dividing the first record video signal into M pieces (M is an integral number) in a field unit of channels and dividing each channel into N pieces (N is an integral number) of segments, and NB1 pieces' worth of signals calculated in terms of the number of blocks may be recorded in each track, or it is processed so that a second record video signal in a block unit including data of K2 pieces of sampled picture elements per block is generated from said second video signal by sampling it, said second record video signal is recorded digitally while being divided into M ×N/m pieces per field (M×N×2/m pieces per frame) of tracks in accordance with a ratio m of bands or information quantities of said first record video signal to said second record video signal, and NB2 pieces' worth of signals calculated in terms of the number of blocks may be recorded in each track, and said respective parameters are set so as to satisfy $NB2=NB1\times K1/K2$, thereby to reproduce a tape where either one of said first or second record video signal has been recorded;

an identification means for identifying whether either one of said first or second record video signal has been recorded; and means for processing said first or second record video signal reproduced from said reproducing means in response to the output from said identification means, and restoring and outputting a signal having the same format as that of said first video signal when reproduction of said first record video signal is identified or restoring and outputting a signal having the same format as that of said second video signal when reproduction of said second record video signal is identified.

16. An apparatus for reproducing a video signal from a tape where either one of a first video signal or a second video signal has been recorded on parallel and oblique tracks, comprising:

a reproducing means for reproducing a tape, in which it is processed so that a first record video signal in a line unit including S1 pieces of sampled picture elements per line is generated from said first video signal by sampling it, said first record video signal is recorded analogically while being divided into M×N pieces per field (M×N×2 pieces per frame) of tracks by dividing the first record video signal into M pieces (M is an integral number) in a field unit of channels and dividing each channel into N pieces (N is an integral number) of segments, and L1 lines' worth of signals calculated in terms of the number of lines may be recorded in each track, or it is processed so that a second record video signal in a block unit including data of K2 pieces of sampled picture elements per block is generated from said second video signal by sampling it, the second record video signal is recorded digitally while being divided into M×N/m pieces per field (M×N ×2/m pieces per frame) of tracks in accordance with a ratio m of bands or information quantities of the first record video signal to the second record video signal, and NB2 pieces' worth of signals calculated in terms of the number of blocks may be recorded in each track, thereby to reproduce a tape where either one of said first or second record video signal has been recorded;

an identification means for identifying whether either one of said first or second record video signal has been recorded; and means for processing said first or second record video signal reproduced from said reproducing means in response to the output from said identification means, and restoring and outputting a signal having the same format as that of said first video signal when reproduction of said first record video signal is identified or restoring and outputting a signal having the same format as that of said second video signal when reproduction of said second record video signal is identified.

17. An apparatus for recording a video signal for recording either one of a first video signal of an analog system or a second video signal of a digital system on parallel and oblique tracks on a tape by means of a plurality of heads arranged on a drum at mutually different angles, comprising:

a mechanism system structured so as to set a number of rotation of said drum and a travelling speed of said tape so that recorded bands per track when said first video signal of an analog system is FM-recorded becomes W;

a code conversion means for adding a code of redundancy X so that a record transmission rate per track when said second video signal having a transmission rate B of a digital system is recorded becomes B(1+X);

means for recording by PCM an output from said code conversion means by at least two heads having mutually different azimuth angles among said heads; wherein recording is performed while setting so that said redundancy X satisfies $B(1+X) \leq 2W$.

18. An apparatus for recording a video signal according to claim 17, wherein said mechanism system has means for recording said first video signal by dividing it into two channels by at least first and second two sets of 4 pieces of heads, and for setting a tape speed when said second video signal is recorded to approximately V/3 of the tape speed which is set so as to record voice information accompanying said first video signal in one channel by at least a third set of two pieces of heads when said first video signal is recorded, and is structured so as to record said second video signal in one channel by either one set of said first or second two pieces of heads.

19. An apparatus for recording a video signal according to claim 1, further comprising apparatus for reproducing the video signal from the tape where either one of the first video signal or the second video signal having mutually different signal formats has been recorded on parallel and oblique tracks of the tape, the apparatus for reproducing including:

reproducing means for reproducing the tape, so that a first record video signal in a line including at S1 pieces of sampled picture elements per line is generated from said first video signal by sampling thereof, the first record video signal is recorded while being divided into M×N pieces per field (M×N×2 pieces per frame) of tracks by dividing the first record video signal into M pieces (M is an integral number) in a field unit of channels and dividing each channel into N pieces (N is an integral number) of segments, and L1 lines' worth of signals calculated in terms of the number of lines may be recorded in each track, or so that a second record video signal in a line unit including S2 pieces of sampled picture elements per line is generated from said second video signal by sampling it, the second record video signal is recorded while being divided into M×N/m pieces per field (M×N×2/m pieces per frame) of tracks in accordance with a ratio m of bands of the first record video signal to the second record video signal and L2 lines' worth of signals calculated in terms of the number of lines may be recorded in each track, and the respective parameters are set so as to satisfy L2=L1×S1/S2, thereby to reproduce the tape where either one of the first or second record video signal has been recorded;

identification means for identifying whether either one of the first or second record video signal has been recorded; and means for processing the first or second record video signal reproduced from the reproducing means in response to the output from the identification means, and restoring and outputting a signal having the same format as that of the first video signal when reproduction of the first record video signal is identified or restoring and outputting a signal having the same format as that of the second video signal when reproduction of the second record video signal is identified.

* * * * *